US012735091B2

(12) United States Patent
Cai et al.

(10) Patent No.: US 12,735,091 B2
(45) Date of Patent: Sep. 15, 2026

(54) SYSTEM AND METHOD TO CHARACTERIZE AND COMPENSATE STEERING UNIVERSAL JOINT TORQUE FLUCTUATION

(71) Applicant: CHINA AUTOMOTIVE SYSTEMS, INC., Wuhan City (CN)

(72) Inventors: Haimian Cai, Ann Arbor, MI (US); Yuchen Lin, Troy, MI (US); Luoyan Peng, Southfield, MI (US)

(73) Assignee: CHINA AUTOMOTIVE SYSTEMS, INC., Wuhan City (CN)

( * ) Notice: Subject to any disclaimer, the term of this patent is extended or adjusted under 35 U.S.C. 154(b) by 408 days.

(21) Appl. No.: 18/443,514

(22) Filed: Feb. 16, 2024

(65) Prior Publication Data

US 2024/0286671 A1 Aug. 29, 2024

Related U.S. Application Data

(60) Provisional application No. 63/448,507, filed on Feb. 27, 2023.

(51) Int. Cl.
*B62D 5/00* (2006.01)
*B62D 5/04* (2006.01)
(Continued)

(52) U.S. Cl.
CPC ........... *B62D 5/0463* (2013.01); *B62D 5/005* (2013.01); *B62D 5/006* (2013.01); *B62D 7/159* (2013.01);
(Continued)

(58) Field of Classification Search
CPC ...... B62D 5/005; B62D 5/006; B62D 5/0463; B62D 5/0472; B62D 7/159;
(Continued)

(56) References Cited

U.S. PATENT DOCUMENTS 7,721,841 B2 5/2010 Shibata
2007/0107977 A1* 5/2007 Shibata .................. B62D 5/008 701/41
(Continued)

FOREIGN PATENT DOCUMENTS

JP 2014084888 A 5/2014
JP 2014221586 A 11/2014
(Continued)

*Primary Examiner* — Erick R Solis
(74) *Attorney, Agent, or Firm* — Dickinson Wright PLLC

(57) ABSTRACT

A method for compensating torque fluctuation in a steering column having at least one universal joint includes: measuring an input steering angle and an output angle of the steering column; determining a steering angular velocity value based on the input steering angle; determining a TAS angular velocity value based on the output angle; determining an angular velocity ratio signal based on a ratio of the steering angular velocity value and the TAS angular velocity value; determining, across a predetermined ranges of values of the input steering angle, a maximum value of the angular velocity ratio signal; determining, based on the maximum value of the angular velocity ratio signal, an equivalent angle and an equivalent phase to characterize the torque fluctuation; determining a compensation torque signal based on the equivalent angle and the equivalent phase; and producing, by an electric motor, a compensation torque based on the compensation torque signal.

20 Claims, 23 Drawing Sheets

(51) Int. Cl.
*B62D 7/15* (2006.01)
*B62D 15/00* (2006.01)
*B62D 15/02* (2006.01)

(52) U.S. Cl.
CPC ....... *B62D 15/0215* (2013.01); *B62D 15/022* (2013.01)

(58) Field of Classification Search
CPC .............. B62D 15/0215; B62D 15/022; B62D 15/0225; B62D 15/0235
See application file for complete search history.

(56) References Cited

U.S. PATENT DOCUMENTS

| | | | | |
|---|---|---|---|---|
| 2008/0027609 | A1 | 1/2008 | Aoki et al. | |
| 2018/0244305 | A1 | 8/2018 | Cai et al. | |
| 2020/0262477 | A1 | 8/2020 | Hirao et al. | |
| 2021/0403085 | A1* | 12/2021 | Hong ........................ | B62D 6/10 |
| 2023/0303158 | A1* | 9/2023 | Koo ........................ | B62D 5/006 |

FOREIGN PATENT DOCUMENTS

| | | | |
|---|---|---|---|
| JP | 6194630 | B2 | 9/2017 |
| WO | 2004113752 | A1 | 12/2004 |

* cited by examiner

TO FIG. 7 CONT.

SYSTEM AND METHOD TO CHARACTERIZE AND COMPENSATE STEERING UNIVERSAL JOINT TORQUE FLUCTUATION

CROSS REFERENCE TO RELATED APPLICATIONS

This utility patent application claims the benefit of U.S. Provisional Patent Application No. 63/448,507, filed Feb. 27, 2023, the contents of which is incorporated herein by reference in its entirety.

BACKGROUND OF THE INVENTION

1. Field of the Invention

A system and method for characterizing and compensating torque fluctuations produced by one or more universal joints in a steering system for a vehicle is provided.

2. Description of the Prior Art

Universal joints are parts that provide for transmission of rotational power across a range of different angles. Universal joints are commonly used in steering systems for vehicles to transfer torque between a steering shaft coupled to a handwheel and a power steering apparatus.

Many conventional steering systems use cross cardan type universal joints. Many different types of universal joints, including cross-cardan type joints cause torque fluctuations when operated at an angle $\alpha$ that is not equal to 180°. Mechanical design of a steering system can suppress some of the fluctuations. However, mechanical design is limited by factors such as the layout of the vehicle, and some of the torque fluctuations caused by the universal joints will typically remain.

SUMMARY OF THE INVENTION

The present disclosure provides a method for compensating torque fluctuation in a steering column having at least one universal joint. The method includes: measuring an input steering angle of the steering column; measuring an output angle of the steering column; determining a steering angular velocity value based on the input steering angle of the steering column; determining a TAS angular velocity value based on the output angle of the steering column; determining an angular velocity ratio signal based on a ratio of the steering angular velocity value and the TAS angular velocity value; determining, across a predetermined ranges of values of the input steering angle, a maximum value of the angular velocity ratio signal; determining, based on the maximum value of the angular velocity ratio signal, an equivalent angle and an equivalent phase, wherein the equivalent angle and the equivalent phase together characterize the torque fluctuation in the steering column that is generated by the at least one universal joint; determining a compensation torque signal based on the equivalent angle and the equivalent phase; and producing, by an electric motor, a compensation torque based on the compensation torque signal to compensate for the torque fluctuation in the steering column The present disclosure also provides a system for compensating torque fluctuation in a steering column having at least one universal joint. The system includes: an electric motor operably coupled to the steering column; an inverter configured to supply power to the electric motor; a steering angle sensor configured to measure an input steering angle of the steering column; an output angle sensor configured to measure output angle of the steering column; and an electronic control unit in functional communication with the inverter. The electronic control unit is configured to: determine a steering angular velocity value based on the input steering angle of the steering column; determine a TAS angular velocity value based on the output angle of the steering column; determine an angular velocity ratio signal based on a ratio of the steering angular velocity value and the TAS angular velocity value; determine, across a predetermined ranges of values of the input steering angle, a maximum value of the angular velocity ratio signal; determine, based on the maximum value of the angular velocity ratio signal, an equivalent angle and an equivalent phase, wherein the equivalent angle and the equivalent phase together characterize the torque fluctuation in the steering column generated by the at least one universal joint; determine a compensation torque signal based on the equivalent angle and the equivalent phase; and command the inverter based on the compensation torque signal to cause the electric motor to produce a compensation torque to compensate for the torque fluctuation in the steering column.

Advantages of the Invention

The invention, in its broadest aspect, provides a system and method to model torque fluctuation in a steering column having at least one universal joint and using relatively few computing resources. At the same time, the system and method of the present disclosure can also automatically collect data and update the current gimbal status in real-time, while the steering column is in use for driving a vehicle.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENTS

Figure 1:
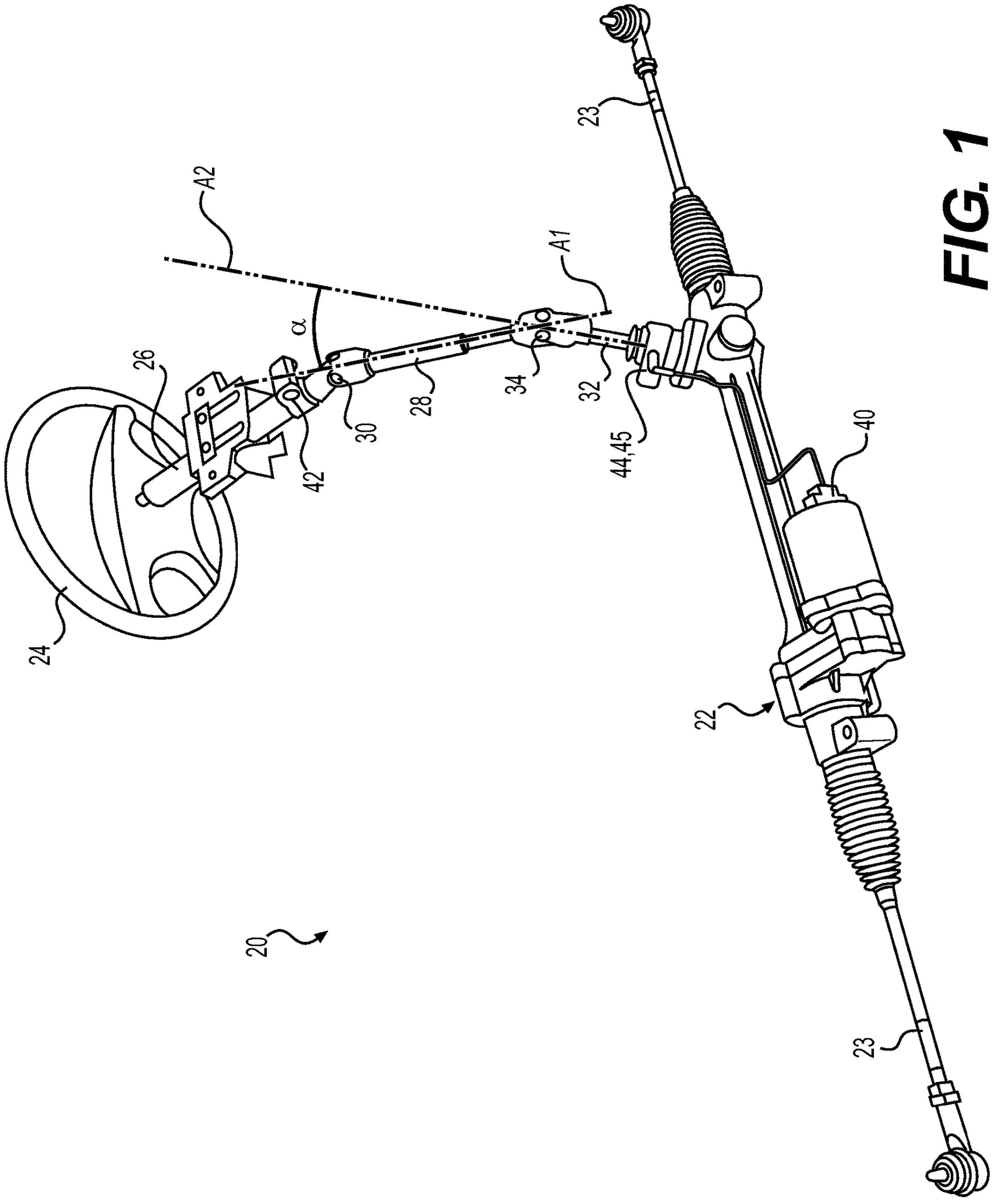
FIG. 1 shows a perspective view of components in an electric power steering (EPS) system, in accordance with the present disclosure.

Referring to the Figures, wherein like numerals indicate corresponding parts throughout the several views, a system and method to characterize and compensate steering universal joint torque fluctuation is provided. The system and method of the present disclosure may be implemented in vehicles with electrical steering, such as an electric power steering (EPS) system. About 90% of vehicles equipped with EPS systems include one or more universal joints in the steering column. According to an aspect of the present disclosure, an electric motor can be configured to increase or decrease torque output to compensate for torque fluctuation caused by one or more universal joints in the steering column.

Universal joints in a steering column can produce torque fluctuations that can be perceived by a driver as an uneven feel when turning a steering wheel (also called a handwheel) at a constant rotation speed. The present disclosure provides for using a steering gear with a motor to add or reduce output at the right time to compensate for torque fluctuation caused by the universal joints. The torque fluctuation is related to a ratio of angular velocity between input and output. The system and method of the present disclosure can calculate the amount of torque fluctuation through an angle sensor installed on the input shaft, which is connected to the steering wheel, and a Torque Angle Sensor (TAS) installed on the output shaft, which is connected to a steering gear. The magnitude of the torque fluctuation can change with the driver's hand force, but the percentage of the torque fluctuation is only related to the angle, and angular velocity. The system and method of the present disclosure may determine the compensation torque by multiplying a torque fluctuation percentage by the torque value of the TAS sensor.

The present disclosure provides a system that can automatically detect torque fluctuation due to a universal joint, even if the driver adjusts a condition of the steering wheel, such as a tilt or height position of the steering wheel. The detected torque fluctuation is used to build a model, and then the model is used to compensate the torque fluctuation in real time to improve steering feel perceived by the driver. A primary objective of the modeling of torque fluctuation is to compensate, or to offset, the torque fluctuation in order to reduce or eliminate any fluctuation in torque that would otherwise be felt by a driver holding the steering wheel. This compensation may require an electric motor and associated circuitry and/or software configured to dynamically adjust torque applied to the steering system in order to compensate for the torque fluctuation caused by one or more universal joints in the steering column.

In order to automatically monitor and compensate the torque fluctuation of the universal joint, an electrical control unit (ECU) may collect required signals in real time. The system and method of the present disclosure may analyze the collected data and establishes a real-time torque fluctuation model of universal joint.

In order to increase the operating efficiency of the function and simplify a certain algorithm, the system and method of the present disclosure may simplify the fluctuation curve of multiple universal joints into single universal joint fluctuation. In order to establish a more accurate model and to obtain an ideal compensation value, the system and method of the present disclosure may collect required data multiple times and produce a model for processing.

FIG. 1 shows components in an electric power steering (EPS) system 20 of the present disclosure. The EPS system 20 includes a steering gear 22 that is operable to move two linkages 23 for turning road wheels (not shown in the FIGS) for steering a vehicle. The steering gear 22 is operably coupled to a handwheel 24 via a steering column 26, 28, 30, 32, 34. The steering column 26, 28, 30, 32, 34 shown in FIG. 1 includes several components including three shafts 26, 28, 32 and two universal joints 30, 34. However, the principles of the present disclosure may be applied to other arrangements of steering columns having a different number and/or configuration of universal joints. The steering column 26, 28, 30, 32, 34 may include additional components not shown in the FIGS, such as tilting and/or telescopic mechanisms for adjusting a position of the handwheel 24.

The steering column 26, 28, 30, 32, 34 includes an input shaft 26 that is directly coupled to the handwheel 24 and to rotate therewith. The steering column 26, 28, 30, 32, 34 also includes an intermediate shaft 28 that is coupled to the input shaft 26 via a first universal joint 30. The input shaft 26 and the intermediate shaft 28 define an angle therebetween, and the first universal joint 30 provides for transferring torque therebetween to cause the intermediate shaft 28 to be rotated in response to rotation of the handwheel 24. The steering column 26, 28, 30, 32, 34 also includes a output shaft 32 that is coupled to the intermediate shaft 28 via a second universal joint 34. The second universal joint 34 provides for transferring torque between the intermediate shaft 28 and the output shaft 32. The intermediate shaft 28 defines and rotates about a first axis A1, and the output shaft 32 defines and rotates about a second axis A2. The first axis A1 and the second axis A2 define a joint angle $\alpha$, across which the second universal joint 34 functions to transfer torque.

The EPS system 20 also includes an electrical control unit (ECU) 40 operably coupled to an electric motor (not shown in FIG. 1) configured to provide an assist torque to the steering gear 22. The EPS system 20 also includes a steering angle sensor 42 operably coupled to the input shaft 26 for measuring an angle of the handwheel 24. The steering angle sensor 42 is in functional communication with the ECU 40 for communicating a signal thereto indicating a steering angle of the handwheel 24. The EPS system 20 also includes a torque angle sensor (TAS) 44 operably coupled to the output shaft 32. The TAS 44 includes an output angle sensor 45 configured to measure an angle of the output shaft 32. The TAS 44 is in functional communication with the ECU 40 for communicating a signal thereto indicating a rotational position of the output shaft 32, which may also be called a TAS angle or an output angle. The TAS 44 may measure other values, such as torque transmitted through the steering column 26, 28, 30, 32, 34 between the steering gear 22 and the handwheel 24.

Figure 2:
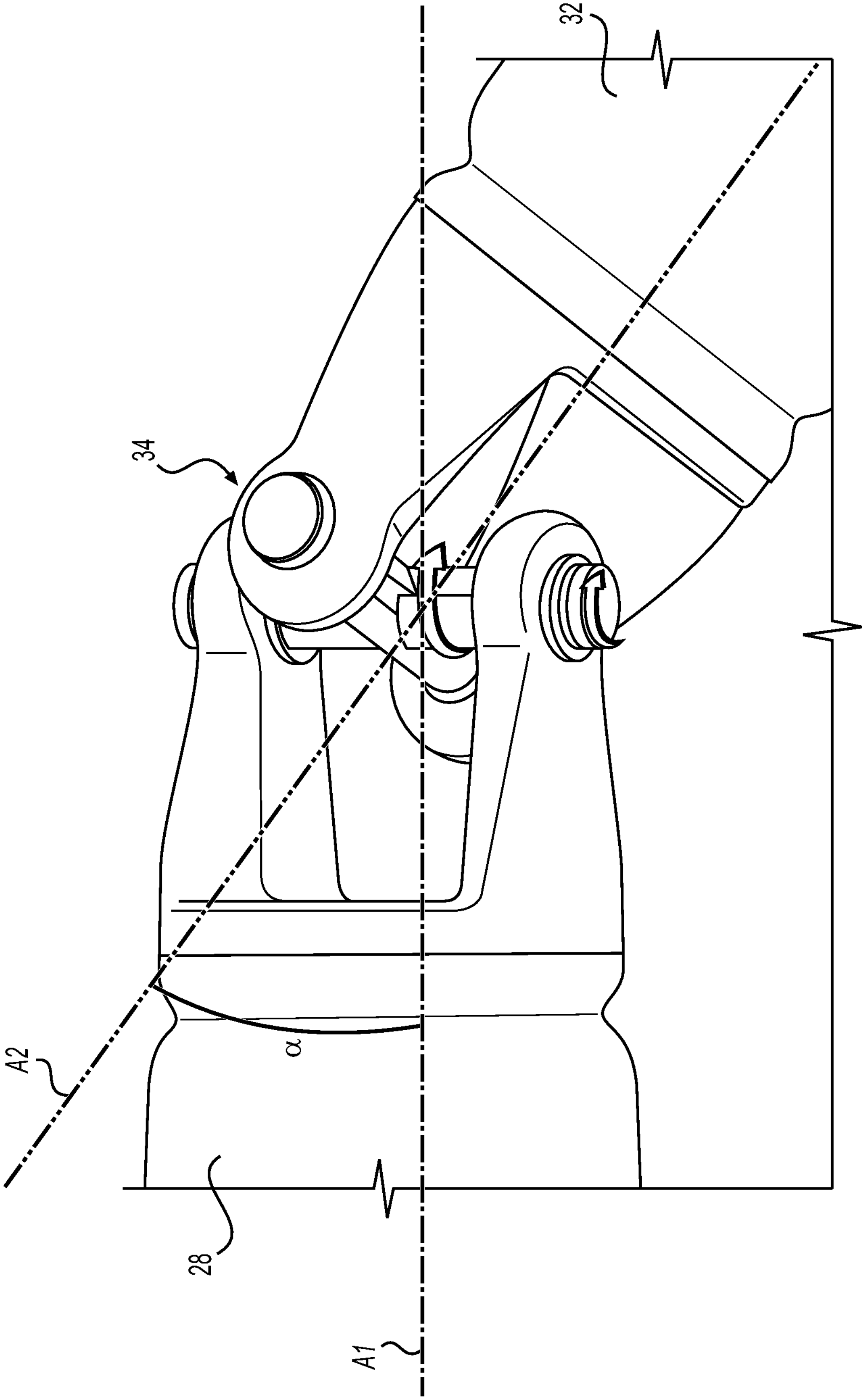
FIG. 2 shows an enlarged sectional perspective view of a universal joint, in accordance with an aspect of the present disclosure.

FIG. 2 shows an enlarged sectional perspective view of the second universal joint 34. As shown, the second universal joint 34 is a cross cardan type universal joint that transfers torque between the intermediate shaft 28 and the output shaft 32 and through the joint angle α therebetween.

Figure 3:
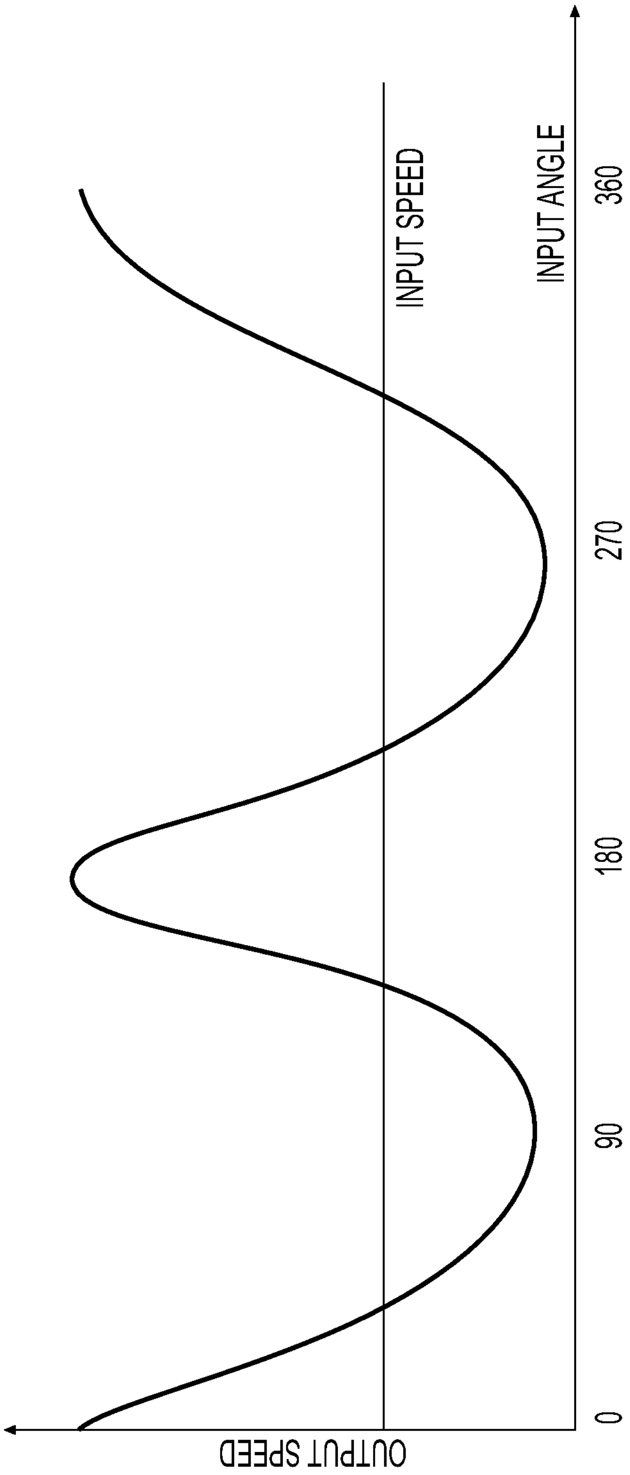
FIG. 3 shows a graph of output speed vs. input angle of the universal joint with a constant input speed.

FIG. 3 shows a graph of output speed vs. input angle of the second universal joint 34 with a constant input speed. As shown, the output speed has a sinusoidal variation as a function of the input angle. This is a known feature of cross cardan type universal joints and can cause a variation in torque that is perceptible to a driver holding the handwheel 24.

In an ideal state (friction is 0 N), the input shaft and the output shaft have the same power. So the ratio of angular velocity $V_{angle\_in}/V_{angle\_out}$ is inversely proportional to the ratio of torque $T_{in}/T_{out}$, as described in equation (1), below:

$$\frac{\text{Vangle\_in}}{\text{Vangle\_out}} = \frac{Tout}{Tin} \qquad (1)$$

where $V_{angle\_in}$ is an angular velocity of the input shaft 26, $V_{angle\_out}$ is an angular velocity of the output shaft 32, $T_{in}$ is a torque on the input shaft 26, and $T_{out}$ is a torque on the output shaft 32.

Figure 4:
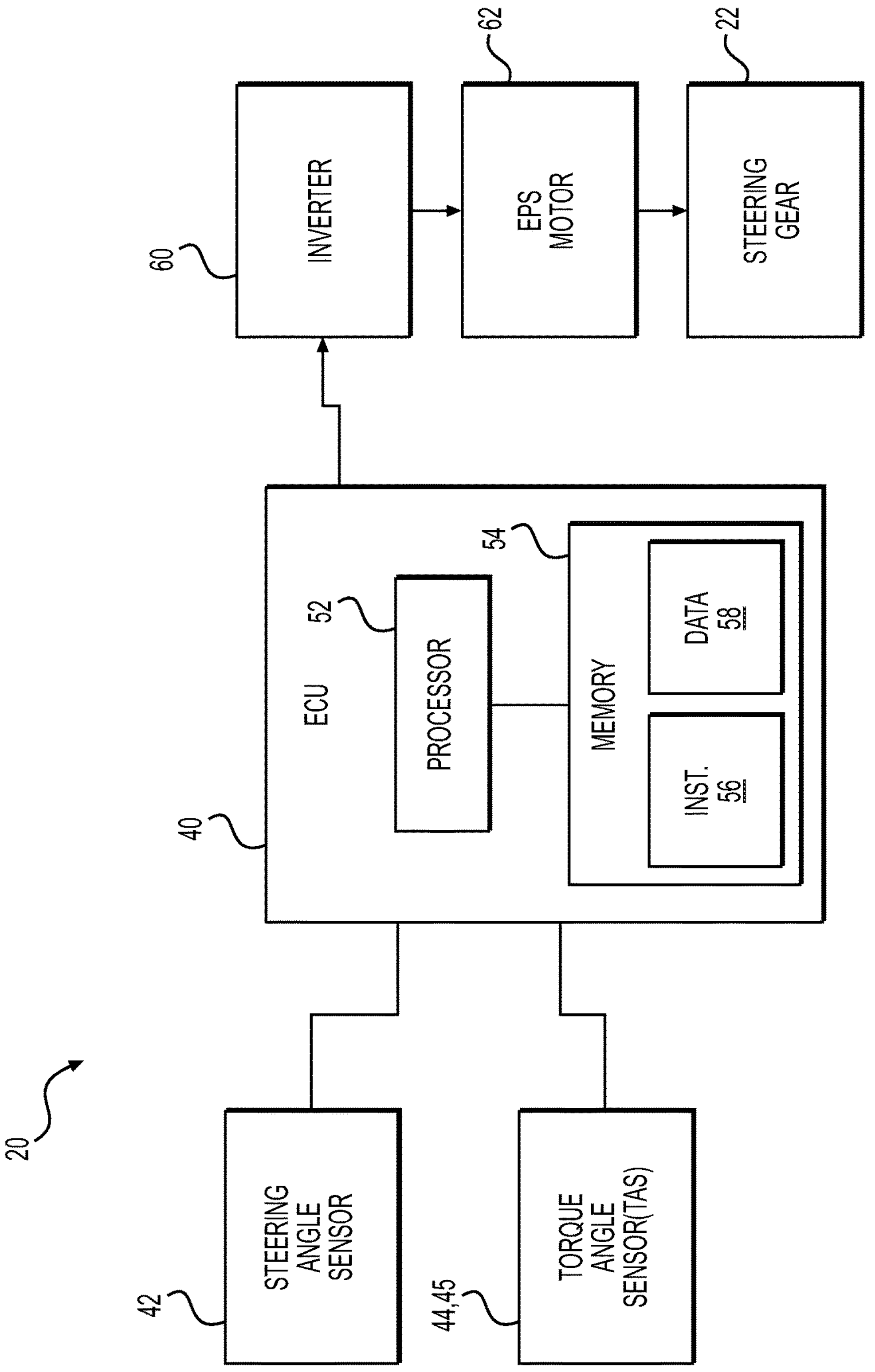
FIG. 4 shows a schematic block diagram of components in the EPS system, in accordance with the present disclosure.

FIG. 4 shows a schematic block diagram of components in the EPS system 20. FIG. 4 shows the ECU 40, which may also be called a controller. The EPS system 20 also includes an inverter 60 configured to supply power to an electric motor 62 to provide the assist torque to the steering gear 22. The ECU 40 may control operation of the electric motor 62. For example, the ECU 40 may generate gate driver signals for controlling conduction of one or more switches in the inverter 60 to control torque and speed of the electric motor 62. The ECU 40 includes a processor 52 coupled to a storage memory 54. The storage memory 54 includes instruction storage 56 storing instructions, such as program code for execution by the processor 52. The storage memory 54 also includes data storage 58 for holding data for use by the processor 52. The data storage 58 may record, for example, values of the parameters measured by one or more sensors, such as the steering angle sensor 42 and the TAS 44, and/or the outcome of functions calculated by the processor 52.

Figure 5:
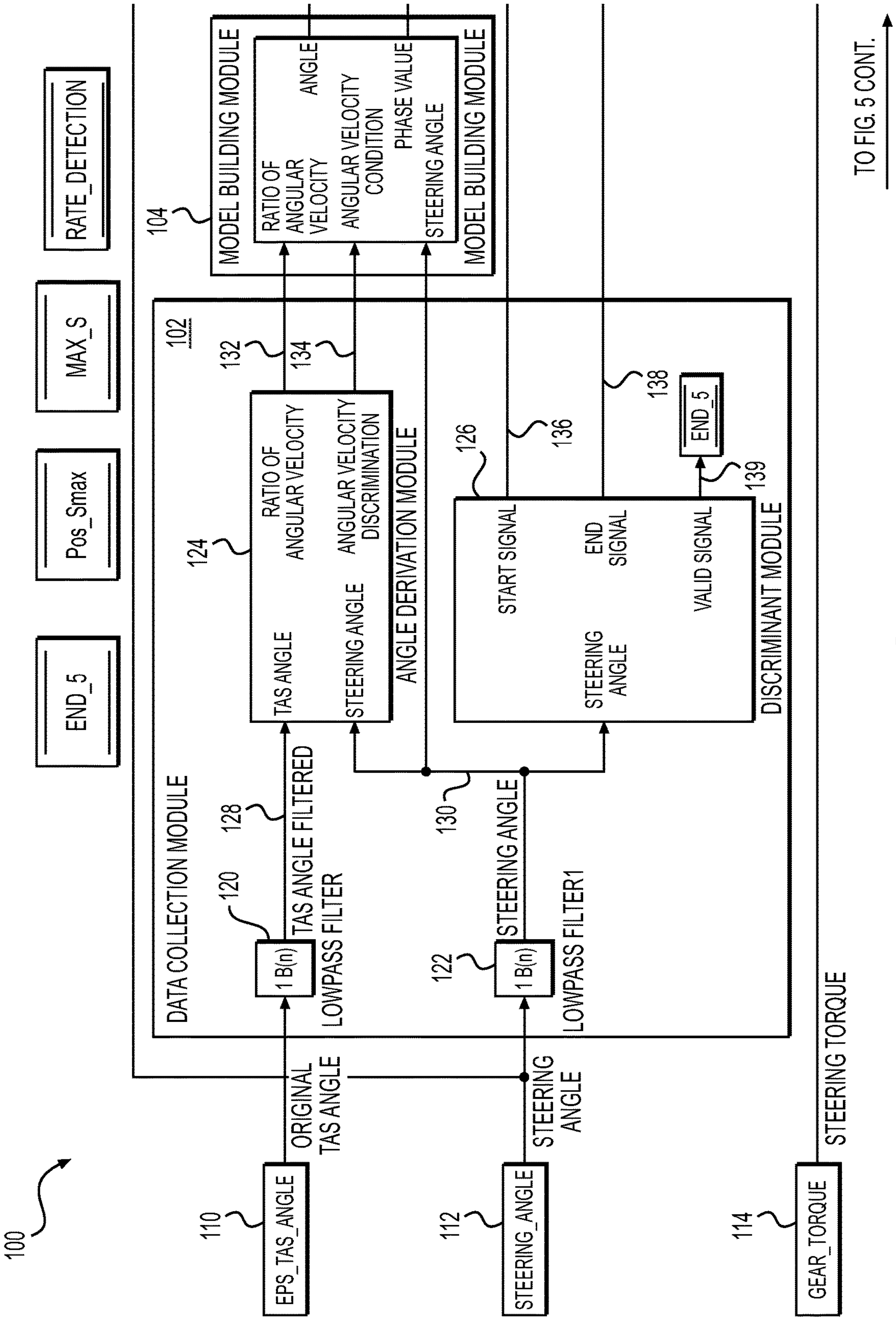
FIG. 5 shows a schematic block diagram of a system to characterize and compensate torque fluctuation caused by one or more universal joints, in accordance with the present disclosure.
Figure 5:
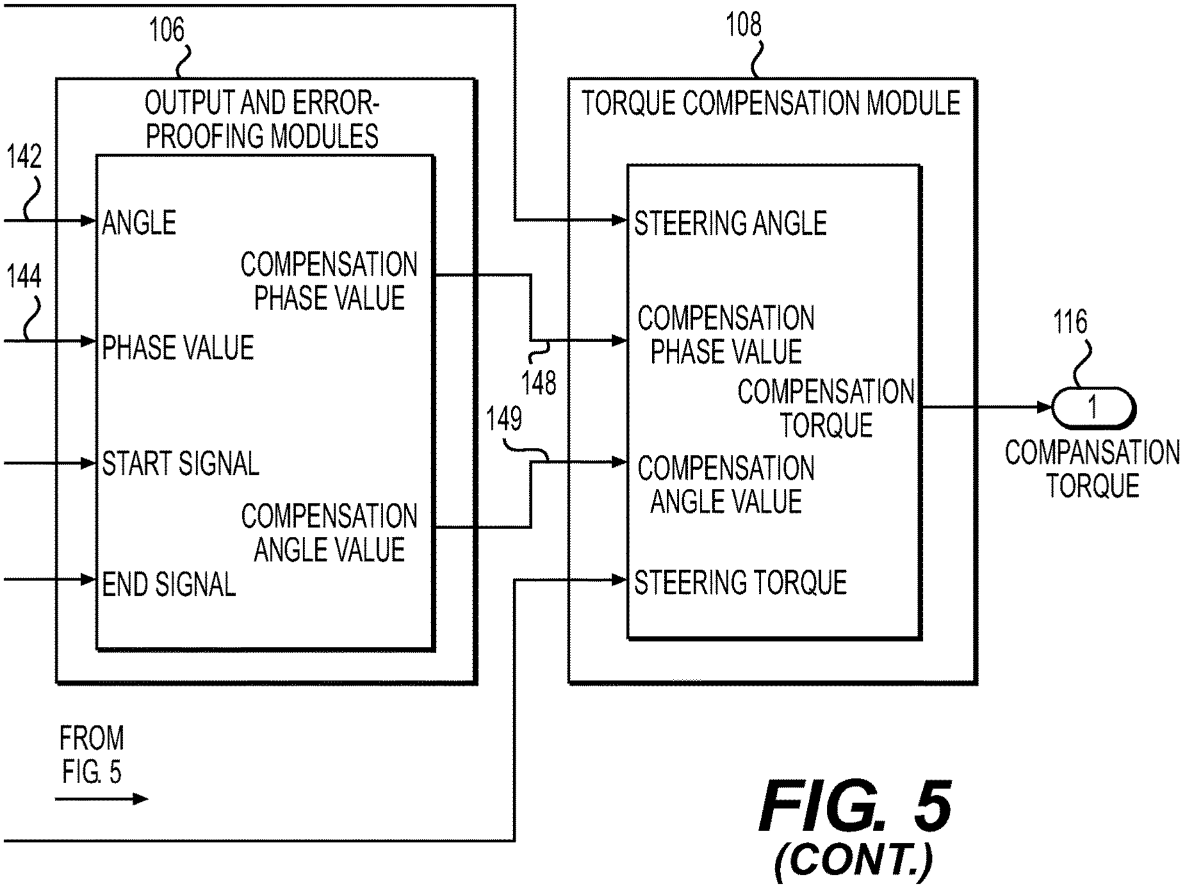

FIG. 5 shows a schematic block diagram of a torque fluctuation system 100 to characterize and compensate torque fluctuation caused by one or more universal joints. The torque fluctuation system 100 may be implemented using one or more hardware and/or software modules. For example, the torque fluctuation system 100 may be implemented in software instructions stored in the instruction storage 56 for execution by the processor 52 of the ECU 40.

As shown, the torque fluctuation system 100 includes a data collection module 102, a model building module 104, an output and error-proofing module 106, and a compensation torque calculator 108, which may also be called a torque compensation module. The torque fluctuation system 100 takes, as inputs, a TAS angle signal 110, a steering angle signal 112, and a steering torque signal 114. The TAS angle signal 110, also called original TAS Angle, represents an angular position of the output shaft 32, as measured by the TAS 44. The steering angle signal 112 represents an angular position of the input shaft 26, as measured by the steering angle sensor 42. The steering torque signal 114 represents a torque transmitted through the steering column 26, 28, 30, 32, 34 between the steering gear 22 and the handwheel 24. The steering torque signal 114 may be produced based on a measurement by the TAS 44. The steering torque signal 114 may be calculated based on one or more measured values, such as angular positions that vary with twisting of a torsion bar. The torque fluctuation system 100 generates, as an output, a compensation torque signal 116. The compensation torque signal 116 may be provided to the inverter 60 to cause the electric motor 62 to produce a corresponding compensation torque to compensate for fluctuations in torque resulting from the operation of the universal joints 30, 34 in the steering column 26, 28, 30, 32, 34.

The data collection module 102 may collect required modeling data that meets the following requirements: The steering wheel is rotated in a constant direction (either in a clockwise or a counter-clockwise direction); Steering wheel speed is kept at 10°/s to 200°/s; and Steering wheel rotation travel up to 200°.

The data collection module 102 performs two primary functions. First, the data collection module 102 performs initial processing on the collected data and converts it to values needed for modeling; and second, the data collection module 102 ensures that the collected data is valid and meets a given set of requirements.

For the efficiency of subsequent modeling, it may be advantageous and/or necessary to preprocess the collected data to ensure the accuracy of the data. As shown in FIG. 5, the data collection module 102 includes a first low-pass filter (LPF) 120, a second LPF 122, an angle derivation calculator 124, and a discriminant calculator 126. Each of the LPFs 120, 122 may include a first-order low-pass filter to reduce influence of signal noise and make the corresponding angle value more smooth.

The first LPF 120 receives the TAS angle signal 110 and produces a filtered TAS angle signal 128. The second LPF 122 receives the steering angle signal 112 and produces a filtered steering angle signal 130. The angle derivation calculator 124 takes, as inputs, the filtered TAS angle signal 128 and the filtered steering angle signal 130. The angle derivation calculator 124 generates, as outputs, an angular velocity ratio signal 132 and an angular velocity condition signal 134, which may also be called an angular velocity discrimination signal. The discriminant calculator 126 takes, as inputs, the filtered TAS angle signal 128 and the filtered steering angle signal 130. The discriminant calculator 126 generates, as outputs, a start signal 136, an end signal 138, and a valid indication signal 139.

Still referring to FIG. 5, the model building module 104 takes, as inputs, the angular velocity ratio signal 132, the angular velocity condition signal 134, and the filtered steering angle signal 130. The model building module 104 generates, as outputs, an equivalent angle signal 142 and an equivalent phase signal 144 based on one or more of the angular velocity ratio signal 132, the angular velocity condition signal 134, and/or the filtered steering angle signal 130. The equivalent angle signal 142 and the equivalent phase signal 144 may, together, characterize the torque fluctuation produced by the universal joints 30, 34 of the steering column 26, 28, 30, 32, 34.

The output and error-proofing module 106 takes, as inputs, the equivalent angle signal 142 and the equivalent phase signal 144. The output and error-proofing module 106 generates, as outputs, a compensation phase signal 148 and a compensation angle signal 149 based on the equivalent angle signal 142 and the equivalent phase signal 144.

The compensation torque calculator 108 takes, as inputs, the compensation phase signal 148, the compensation angle signal 149, the steering angle signal 112, and the steering torque signal 114. The compensation torque calculator 108 generates, as an output, the compensation torque signal 116 based on one or more of: the compensation phase signal 148, the compensation angle signal 149, the steering angle signal 112, and the steering torque signal 114.

Figure 6:
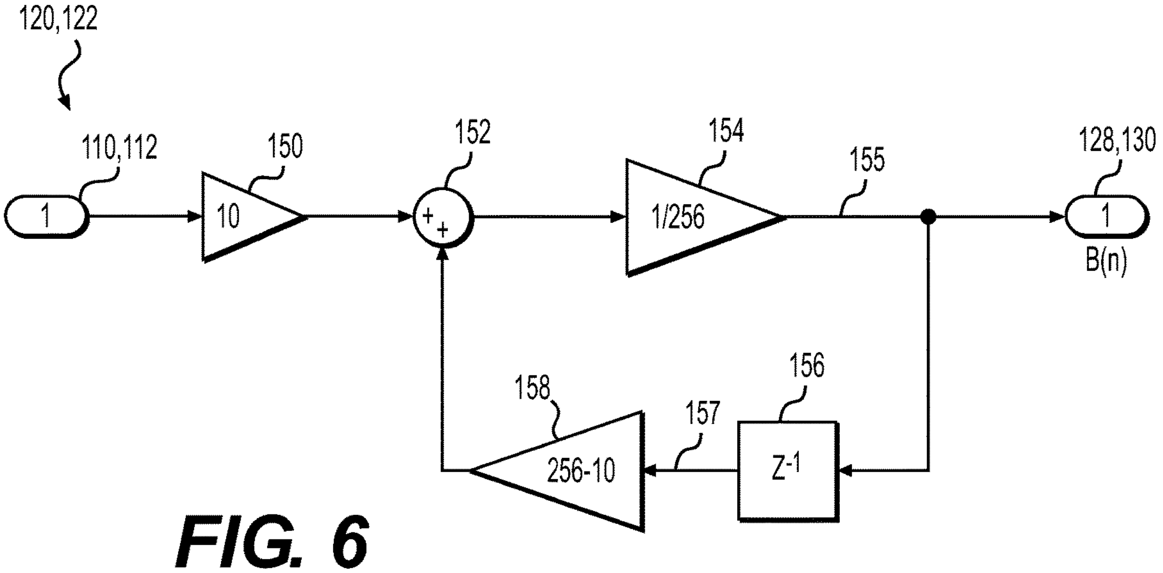
FIG. 6 shows a schematic block diagram of a low-pass filter (LPF) of the system of FIG. 5.

FIG. 6 shows a schematic block diagram of an LPF 120, 122, which may be a common design for each of the first LPF 120 and the second LPF 122. The LPF 120, 122 includes a first multiplier 150 configured to multiply an input signal, such as the TAS angle signal 110 or the steering angle signal 112, by a first constant value. The first multiplier 150 may multiply the input signal by ten (10.0), although a different value may be used for the first constant value. The LPF 120, 122 also includes a first adder 152 configured to add two or more different values together and to produce a summation signal. The first multiplier 150 is coupled to the first adder 152 to provide an input thereto. The LPF 120, 122 includes a second multiplier 154 configured to multiply the summation signal from the first adder 152 by a second constant value. The second constant value may be 1/256, although a different value may be used for the second constant value. The second multiplier 154 produces an output signal 155 that is output by the LPF 120, 122 as a corresponding one of the filtered TAS angle signal 128 or the filtered steering angle signal 130. The LPF 120, 122 also includes a first delay block 156 and a third multiplier 158. The first delay block 156 takes the output signal 155 and produces a first delayed output signal 157. The third multiplier 158 is configured to multiply the first delayed output signal 157 from the first delay block 156 by a third constant value. The third constant value may be two hundred and forty-six (256−10), although a different value may be used for the third constant value. The third multiplier 158 supplies an output value to the first adder 152, which adds that value to an output of the first multiplier 150 to produce the summation signal that is supplied to the second multiplier 154.

Figure 7:
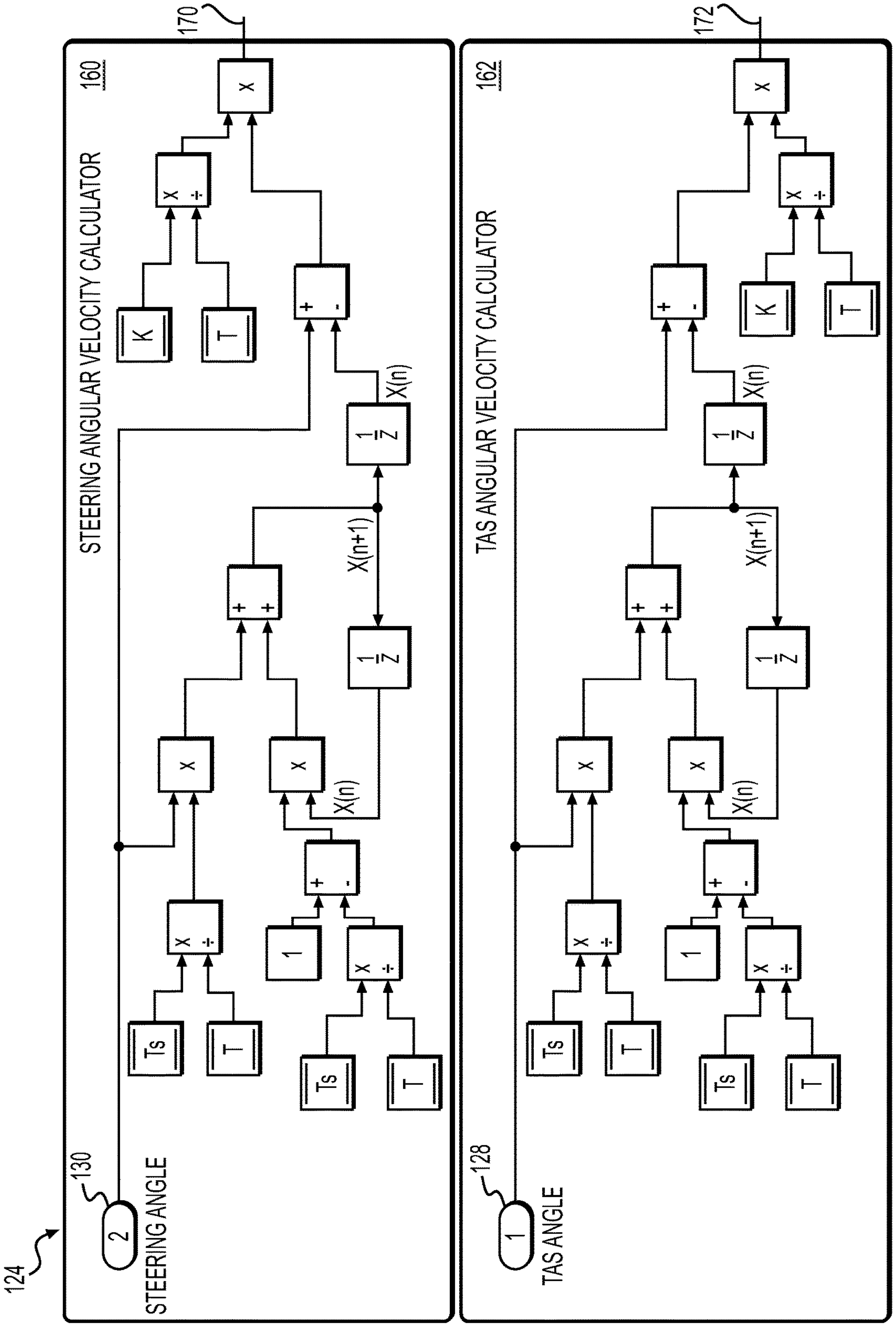
FIG. 7 shows a schematic block diagram of an angle derivation calculator of the data collection module of the system of FIG. 5.
Figure 7:
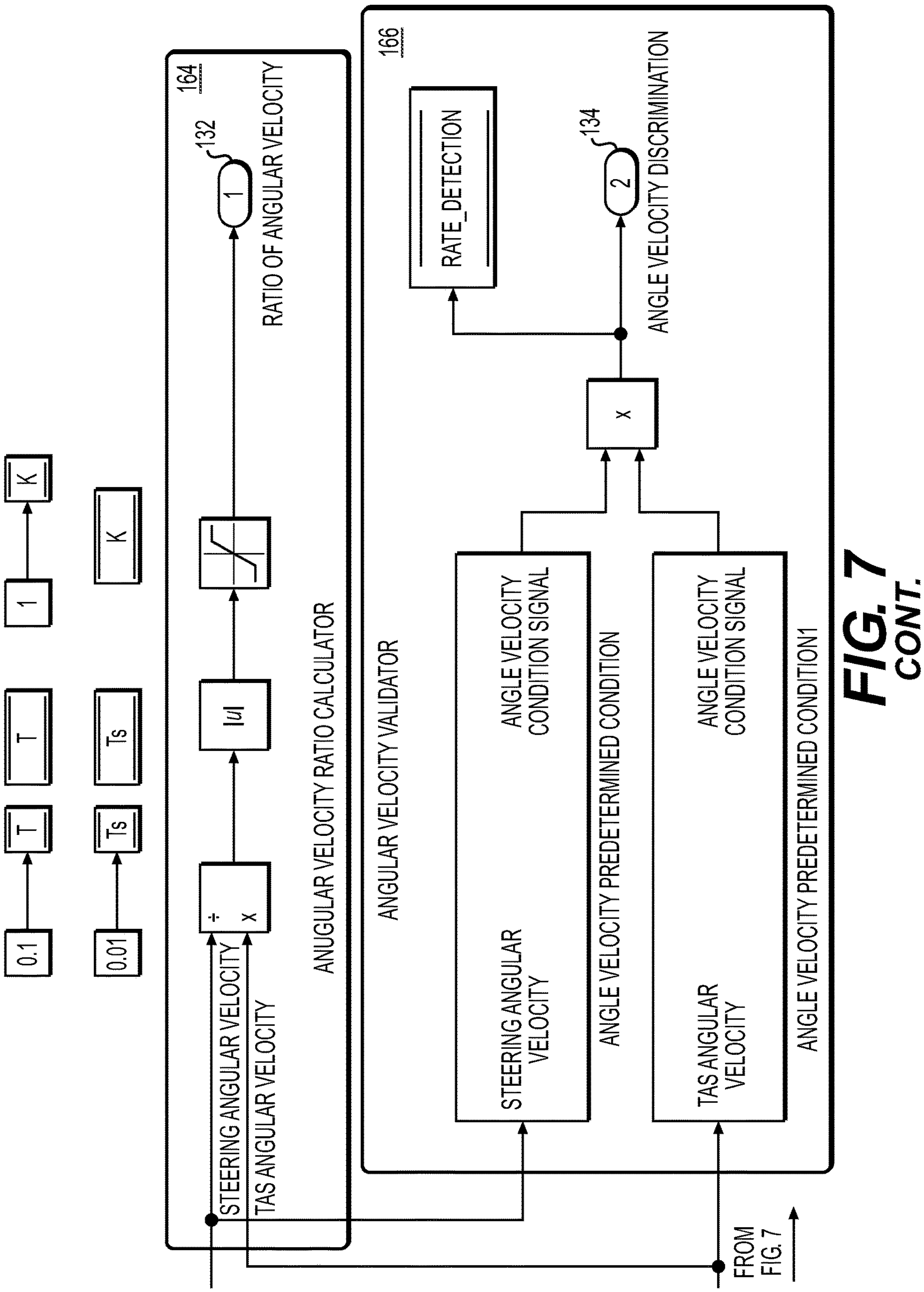

FIG. 7 shows a schematic block diagram of the angle derivation calculator 124 of the data collection module 102. As shown in FIG. 7, the angle derivation calculator 124 includes a steering angular velocity calculator 160, a TAS angular velocity calculator 162, an angular velocity ratio calculator 164, and an angular velocity validator 166.

The data collection module 102 will process the TAS angle signal 110 and the steering angle signal 112 into variables that can be directly used by the model building module 104.

The steering angular velocity calculator 160 and the TAS angular velocity calculator 162 each determine an angular velocity value of the input shaft 26 and the output shaft 32, respectively. The angular velocity ratio calculator 164 calculates a ratio of the angular velocities of the input shaft 26 and the output shaft 32, which can be used to model the effect of the universal joints 30, 34.

The steering angular velocity calculator 160 takes, as an input, the filtered steering angle signal 130 and computes a steering angular velocity signal 170 based on the filtered steering angle signal 130. The TAS angular velocity calculator 162 takes, as an input, the filtered TAS angle signal 128 as an input, and computes a TAS angular velocity signal 172 based on the filtered TAS angle signal 128. The angular velocity ratio calculator 164 takes, as inputs, the steering angular velocity signal 170 and TAS angular velocity signal 172. The angular velocity ratio calculator 164 computes the angular velocity ratio signal 132 based on the steering angular velocity signal 170 and TAS angular velocity signal 172. The angular velocity validator 166 takes, as inputs, the steering angular velocity signal 170 and TAS angular velocity signal 172. The angular velocity validator 166 determines the angular velocity condition signal 134 based on the steering angular velocity signal 170 and TAS angular velocity signal 172.

If the steering wheel speed is too fast or too slow, the data processing and modeling may be inaccurate. The angular velocity validator 166 may determine if the steering angular velocity and the TAS angular velocity each meet a predetermined criteria. For example, the angular velocity validator 166 may determine if the steering angular velocity is greater than ten degrees per second (10°/s). The angular velocity validator 166 may also determine if the TAS angular velocity is greater than ten degrees per second (10°/s) and less than two hundred degrees per second (200°/s). However, these are merely examples, and other values may be used as the criteria for the steering angular velocity and/or the TAS angular velocity. The angular velocity validator 166 may assert the angular velocity condition signal 134 based on determining the steering angular velocity and the TAS angular velocity each meet the predetermined criteria.

Figure 8:
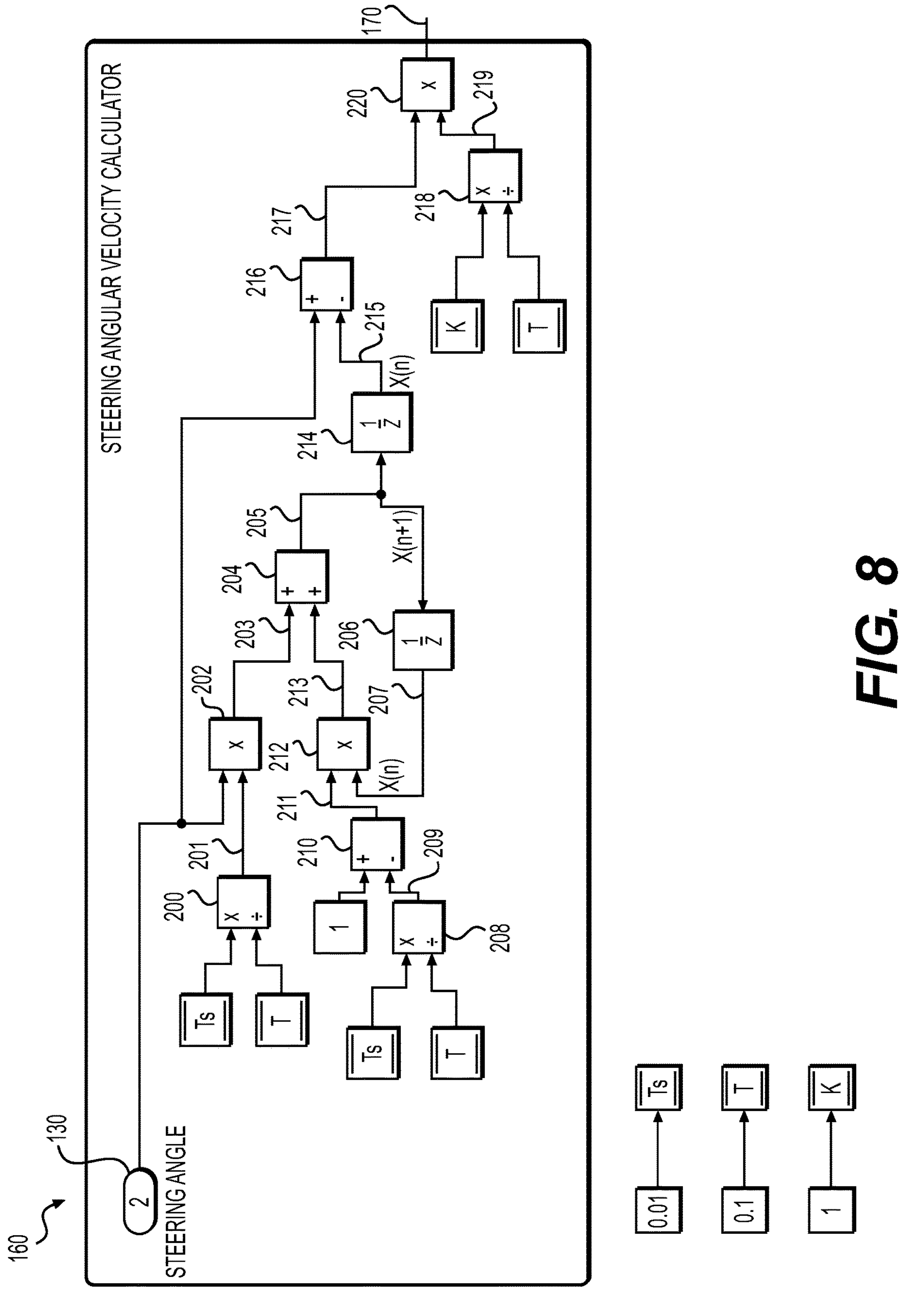
FIG. 8 shows a schematic block diagram of a steering angular velocity calculator of the angle derivation calculator of FIG. 7.

FIG. 8 shows a schematic block diagram of the steering angular velocity calculator 160 of the angle derivation calculator 124. The steering angular velocity calculator 160 includes a first divider 200 configured to divide a first timing constant Ts by a second timing constant T and to produce a first quotient signal 201. The first timing constant Ts may be set to 0.01, and the second timing constant T may be set to 0.1. However, either or both of the first timing constant Ts and/or the second timing constant T may have a different value. A fourth multiplier 202 is configured to multiply the filtered steering angle signal 130 with the first quotient signal 201 and to produce a fourth product signal 203. A second adder 204 generates a first intermediate signal 205 at an n+1 time step based on the fourth product signal 203.

The steering angular velocity calculator 160 also includes a second delay block 206 configured to produce a second intermediate signal 207 at an n time step based on the first intermediate signal 205. A second divider 208 is configured to divide the first timing constant Ts by the second timing constant T and to produce a second quotient signal 209. A first subtractor 210 subtracts the second quotient signal 209 from one (1) to produce a first difference signal 211. A fifth multiplier 212 is configured to multiply the first difference signal 211 with the second intermediate signal 207 and to produce a fifth product signal 213. The second adder 204 adds the fourth product signal 203 to the fifth product signal 213 to produce the first intermediate signal 205. A third delay block 214 generates a third intermediate signal 215 at an n time step based on the first intermediate signal 205.

The steering angular velocity calculator 160 also includes a second subtractor 216 configured to subtract the third intermediate signal 215 from the filtered steering angle signal 130 and to produce a second difference signal 217. A third divider 218 is configured to divide a first tuning constant K by the second timing constant T and to produce a third quotient signal 219. The first tuning constant K may have a value of 1.0. However, the first tuning constant K may have a different value. A sixth multiplier 220 is configured to multiply the second difference signal 217 with the third quotient signal 219 and to produce the steering angular velocity signal 170.

Figure 9:
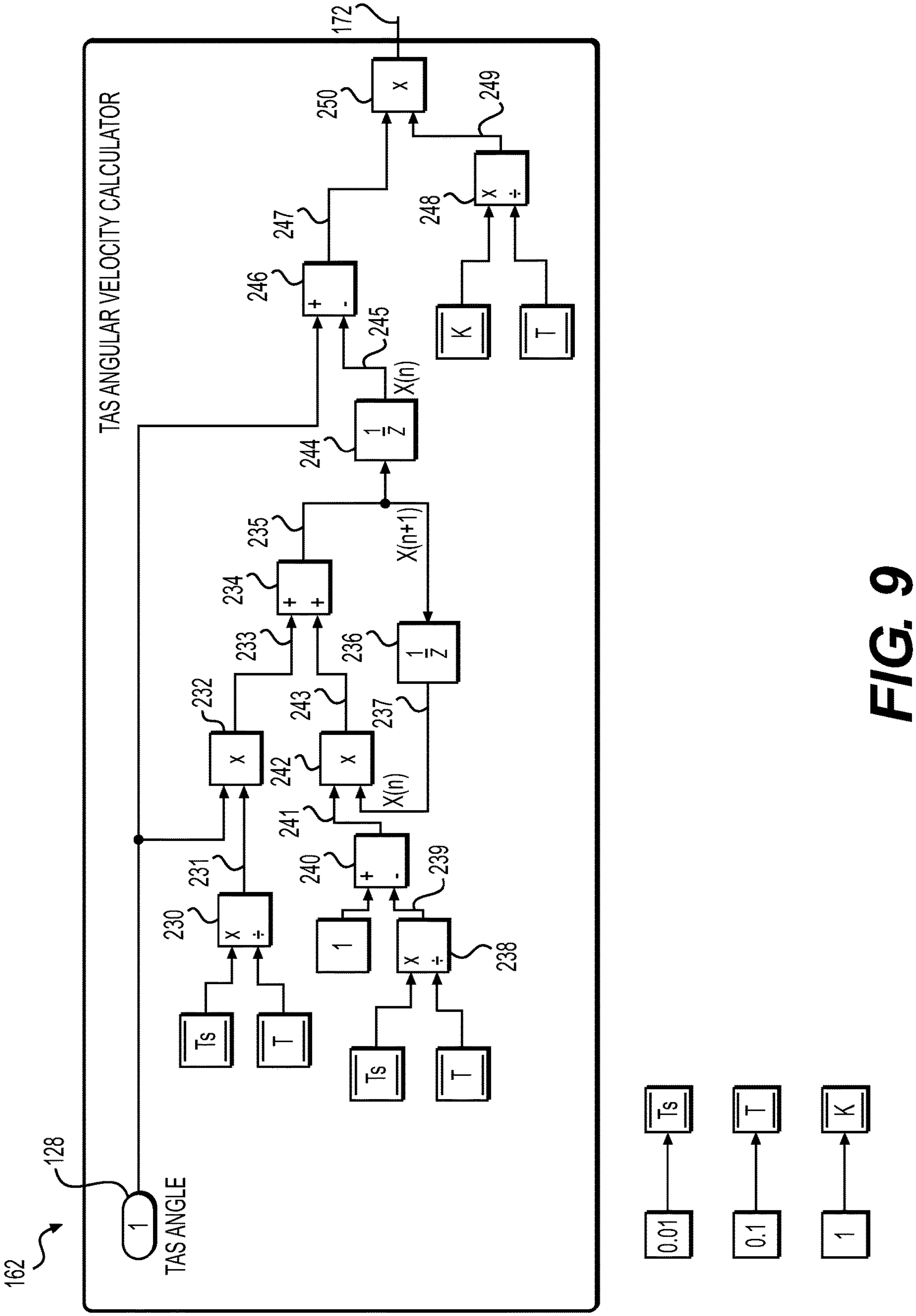
FIG. 9 shows a schematic block diagram of a TAS angular velocity calculator of the angle derivation calculator of FIG. 7.

FIG. 9 shows a schematic block diagram of a TAS angular velocity calculator 162 of the angle derivation calculator 124. The TAS angular velocity calculator 162 includes a fourth divider 230 configured to divide the first timing constant Ts by the second timing constant T and to produce a fourth quotient signal 231. A seventh multiplier 232 is configured to multiply the filtered TAS angle signal 128 with the fourth quotient signal 231 and to produce a seventh product signal 233. A third adder 234 generates a fourth intermediate signal 235 at an n+1 time step based on the seventh product signal 233.

The TAS angular velocity calculator 162 also includes a fourth delay block 236 configured to produce a fifth intermediate signal 237 at an n time step based on the fourth intermediate signal 235. A fourth divider 238 is configured to divide the first timing constant Ts by the second timing constant T and to produce a fourth quotient signal 239. A third subtractor 240 subtracts the fourth quotient signal 239 from one (1) to produce a third difference signal 241. An eighth multiplier 242 is configured to multiply the third difference signal 241 with the fifth intermediate signal 237 and to produce an eighth product signal 243. The third adder 234 adds the seventh product signal 233 to the eighth product signal 243 to produce the fourth intermediate signal 235. A fifth delay block 244 generates a sixth intermediate signal 245 at an n time step based on the fourth intermediate signal 235.

The TAS angular velocity calculator 162 also includes a fourth subtractor 246 configured to subtract the sixth intermediate signal 245 from the filtered TAS angle signal 128 and to produce a fourth difference signal 247. A fifth divider 248 is configured to divide the first tuning constant K by the second timing constant T and to produce a fifth quotient signal 249. The first tuning constant K may have a value of 1.0. However, the first tuning constant K may have a different value. A ninth multiplier 250 is configured to multiply the fourth difference signal 247 with the fifth quotient signal 249 and to produce the TAS angular velocity signal 172.

Figure 10A:
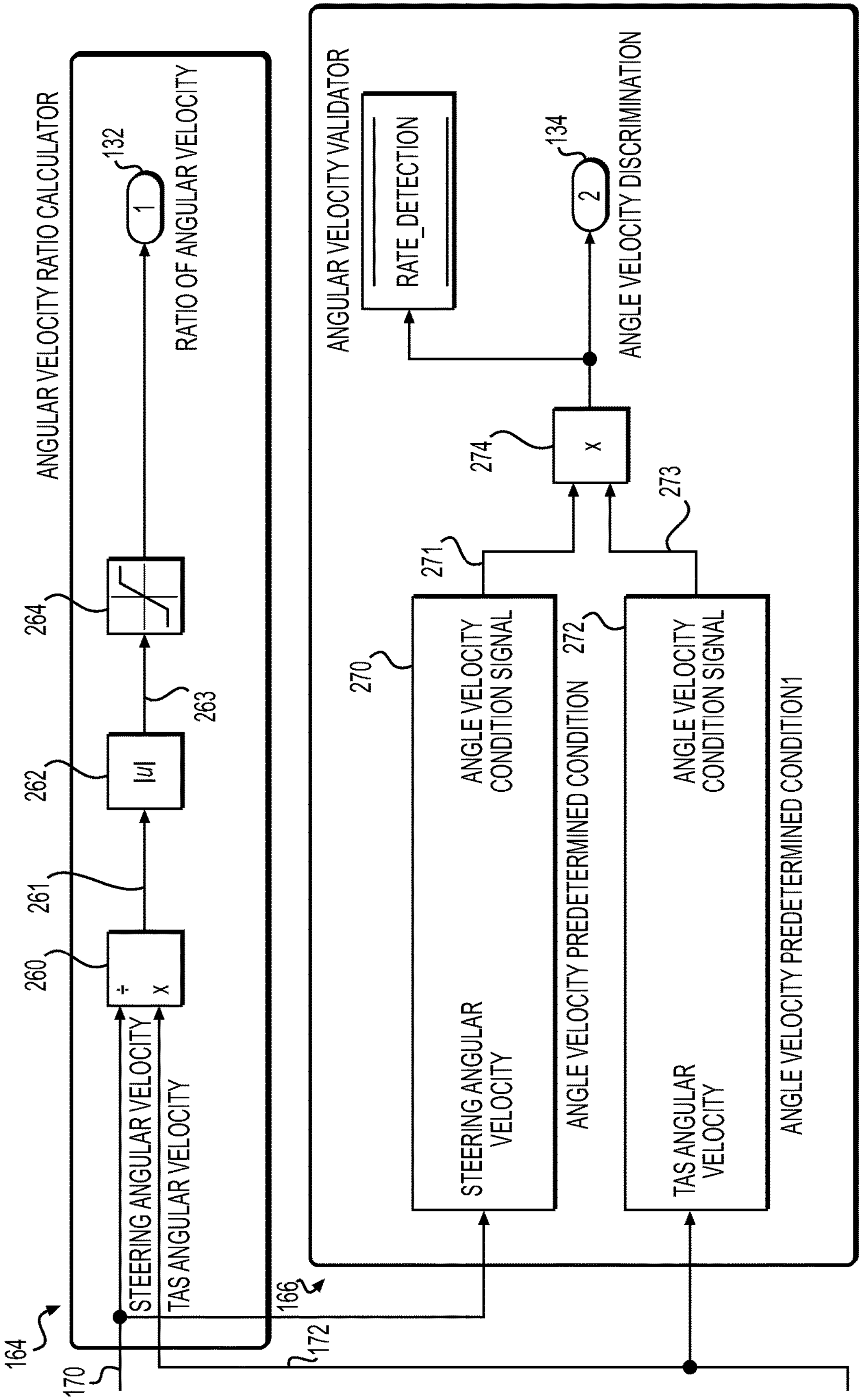
FIG. 10A shows a schematic block diagram of an angular velocity ratio calculator and an angular velocity validator of the angle derivation calculator of FIG. 7.

FIG. 10A shows a schematic block diagram of an angular velocity ratio calculator 164 and an angular velocity validator 166 of the angle derivation calculator 124. The angular velocity ratio calculator 164 includes a sixth divider 260 that is configured to divide the TAS angular velocity signal 172 by the steering angular velocity signal 170 and to produce a sixth quotient signal 261. A first absolute value calculator 262 is configured to produce a first absolute value signal 263 based on the sixth quotient signal 261. A limiter 264 determines the angular velocity ratio signal 132 based on the first absolute value signal 263. The limiter 264 may determine the angular velocity ratio signal 132 by clamping or limiting the first absolute value signal 263. The limiter 264 may function to reduce impact of fluctuations that may otherwise result from derivation in computing the steering angular velocity signal 170 and/or the TAS angular velocity signal 172.

The angular velocity validator 166, also shown in FIG. 10A, includes a first angular velocity condition evaluator 270 configured to evaluate the steering angular velocity signal 170 and to generate a first angular velocity predetermined condition signal 271 based on the steering angular velocity signal 170. The angular velocity validator 166 also includes a second angular velocity condition evaluator 272 configured to evaluate the TAS angular velocity signal 172 and to generate a second angular velocity predetermined condition signal 273 based on TAS angular velocity signal 172.

The angular velocity validator 166 also includes a tenth multiplier 274 configured to selectively assert the angular velocity condition signal 134 based on each of the first angular velocity predetermined condition signal 271, and the second angular velocity predetermined condition signal 273. The tenth multiplier 274 may function as an AND operator that asserts the angular velocity condition signal 134 if, and only if, both of the first angular velocity predetermined condition signal 271 and the second angular velocity predetermined condition signal 273 are asserted.

Figure 10B:
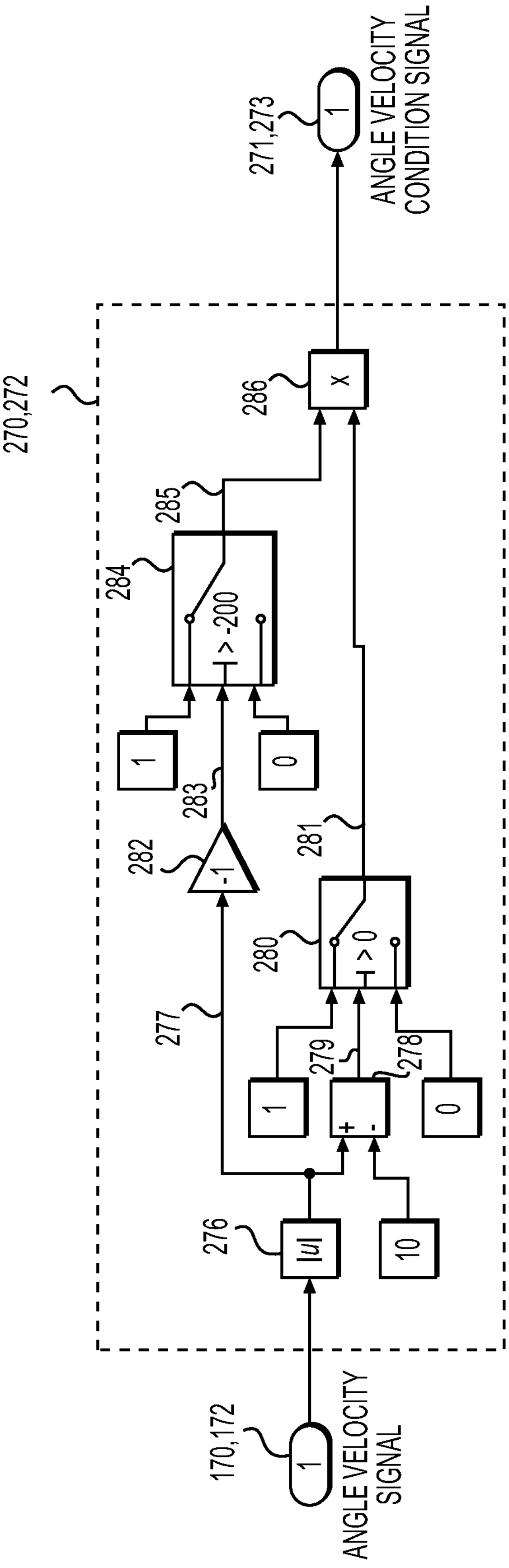
FIG. 10B shows a schematic block diagram of an angular velocity condition evaluator of the angular velocity validator of FIG. 10A.

FIG. 10B shows a schematic block diagram of an angular velocity condition evaluator 270, 272 of the angular velocity validator 166. The angular velocity condition evaluator 270, 272 may be a common design for each of the first angular velocity condition evaluator 270 and the second angular velocity condition evaluator 272.

As shown on FIG. 10B, the angular velocity condition evaluator 270, 272 includes a second absolute value calculator 276 configured to produce a second absolute value signal 277 based on a corresponding one of the steering angular velocity signal 170 or the TAS angular velocity signal 172. A fifth subtractor 278 is configured to subtract a fixed value representing a lower angular velocity threshold value from the second absolute value signal 277 and to produce a fifth difference signal 279. A first comparator 280 is configured to determine if the fifth difference signal 279 is greater than zero. The first comparator 280 may assert first conditional signal 281 based on determining the fifth difference signal 279 is greater than zero. The first comparator 280 may, therefore assert the first conditional signal 281 if, and only if, the corresponding one of the steering angular velocity signal 170 or the TAS angular velocity signal 172 has a value greater than the lower angular velocity threshold value. In some embodiments, and as shown in FIG. 10B, the lower angular velocity threshold value may have a value of ten (10) to represent ten degrees. However, the lower angular velocity threshold value may have a different value.

The angular velocity condition evaluator 270, 272 also includes an inverter 282 configured to calculate an inverse angular velocity signal 283 based on second absolute value signal 277. The inverse angular velocity signal 283 may, therefore, contain a negative value that is proportional to the corresponding one of the steering angular velocity signal 170 or the TAS angular velocity signal 172. A second comparator 284 is configured to determine if the inverse angular velocity signal 283 is greater than a fixed negative value corresponding to an upper angular velocity threshold value. The second comparator 284 may assert a second conditional signal 285 based on determining the inverse angular velocity signal 283 being greater than negative two-hundred. The second comparator 284 may, therefore assert the second conditional signal 285 if, and only if, the corresponding one of the steering angular velocity signal

170 or the TAS angular velocity signal 172 has a value less than. In some embodiments, and as shown in FIG. 10B, the upper angular velocity threshold value may have a value of two-hundred (200) to represent two-hundred degrees. However, the upper angular velocity threshold value may have a different value.

The angular velocity condition evaluator 270, 272 also includes an eleventh multiplier 286 configured to selectively a corresponding one of the first angular velocity predetermined condition signal 271 or the second angular velocity predetermined condition signal 273, based on each of the first conditional signal 281, and the second conditional signal 285. The eleventh multiplier 286 may function as an AND operator that asserts the corresponding one of the first angular velocity predetermined condition signal 271 or the second angular velocity predetermined condition signal 273 if, and only if, both of the conditional signals 281, 285 are asserted.

Figure 11:
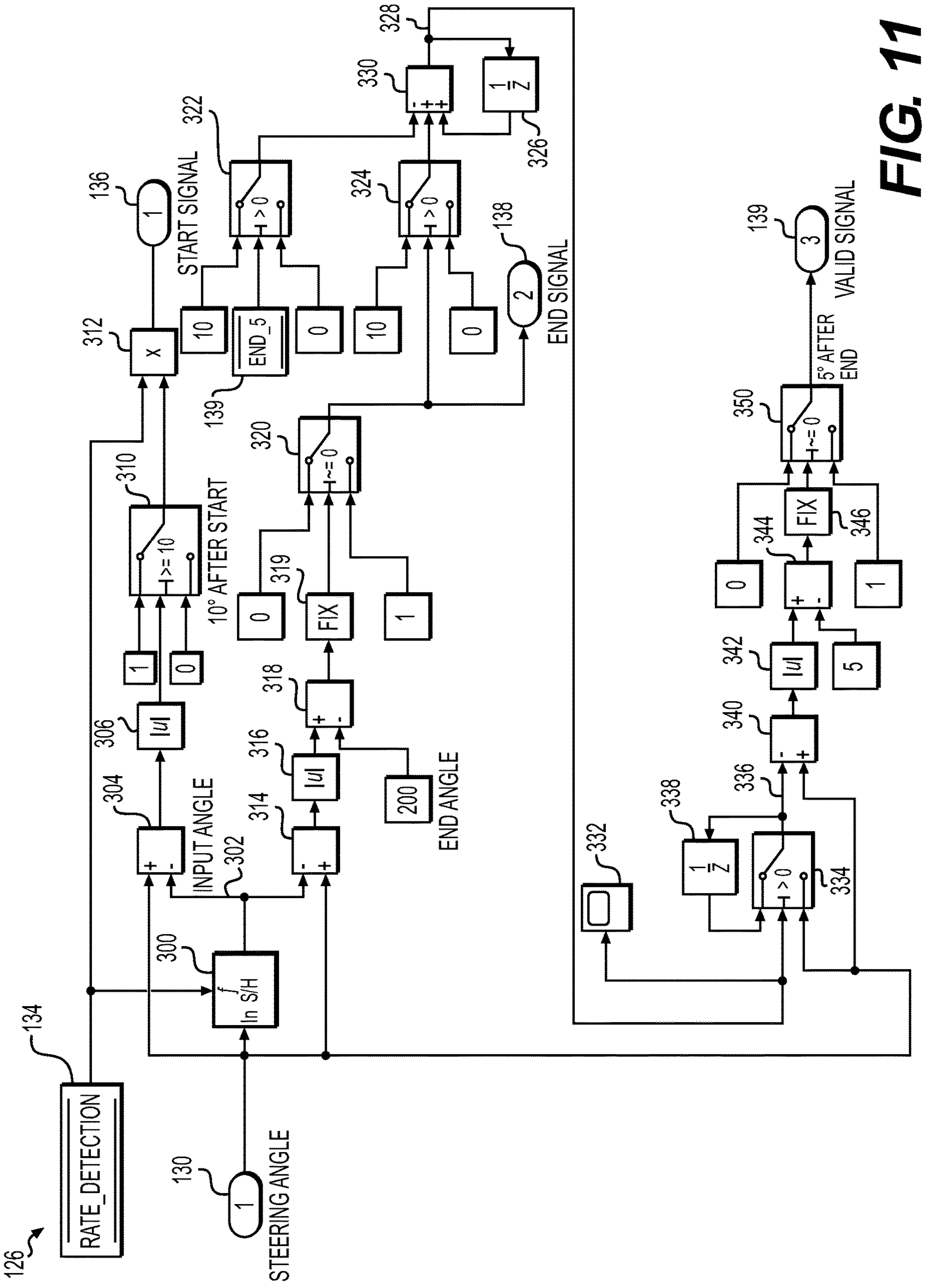
FIG. 11 shows a schematic block diagram of a discriminant calculator of the data collection module of the system of FIG. 5.

FIG. 11 shows a schematic block diagram of the discriminant calculator 126 of the data collection module 102. As shown in FIG. 11, the discriminant calculator 126 takes, as inputs, the filtered steering angle signal 130 and the angular velocity condition signal 134. The discriminant calculator 126 generates each of the start signal 136, the end signal 138, and the valid indication signal 139 based on the filtered steering angle signal 130 and the angular velocity condition signal 134.

As shown on FIG. 11, the discriminant calculator 126 includes a Sample/Hold (S/H) block 300 that stores and holds a value of the filtered steering angle signal 130, as an initial steering angle 302, in response the angular velocity condition signal 134 becoming asserted. The discriminant calculator 126 also includes a fourth comparator 310 configured to determine if the filtered steering angle signal 130 differs from the initial steering angle 302 by more than a predetermined starting angle value. The predetermined starting angle value may be 10 degrees, although another value may be used for the predetermined starting angle value. The discriminant calculator 126 also includes a start signal multiplier 312 that asserts the start signal 136 based on both of the angular velocity condition signal 134 and an output of the fourth comparator 310 both being asserted. In some embodiments, and as shown in FIG. 11, the start signal multiplier 312 asserts the start signal 136 based on the filtered steering angle signal 130 deviating by more than 10-degrees from the initial steering angle 302 while the angular velocity condition signal 134 remains asserted.

As shown on FIG. 11, the discriminant calculator 126 also includes a fifth comparator 320 configured to determine if the steering angle signal 130 differs from the initial steering angle 302 by more than a predetermined end angle value. The fifth comparator 320 is configured to assert the end signal 138 based on the filtered steering angle signal 130 deviating by more than 200-degrees from the initial steering angle 302.

As shown on FIG. 11, the discriminant calculator 126 also includes a sixth comparator 350 configured to assert the valid indication signal 139 based on the filtered steering angle signal 130 and the end signal 138.

The discriminant calculator 126 determines whether the travel of the steering wheel reaches two-hundred degrees (200°) (the fluctuation of the universal joint takes one-hundred and eighty degrees (180°) as a period) to ensure the correctness of the modeling. Because the derivation will cause the data to change drastically at the beginning and end, so in the process of collecting data, the collection will start from 5° after the derivation, and it is still necessary to judge whether it meets the requirements at 10° after the end of data collection. Only when the above conditions are met will it be judged that the data collected in the angle segment is valid and used.

Figure 12:
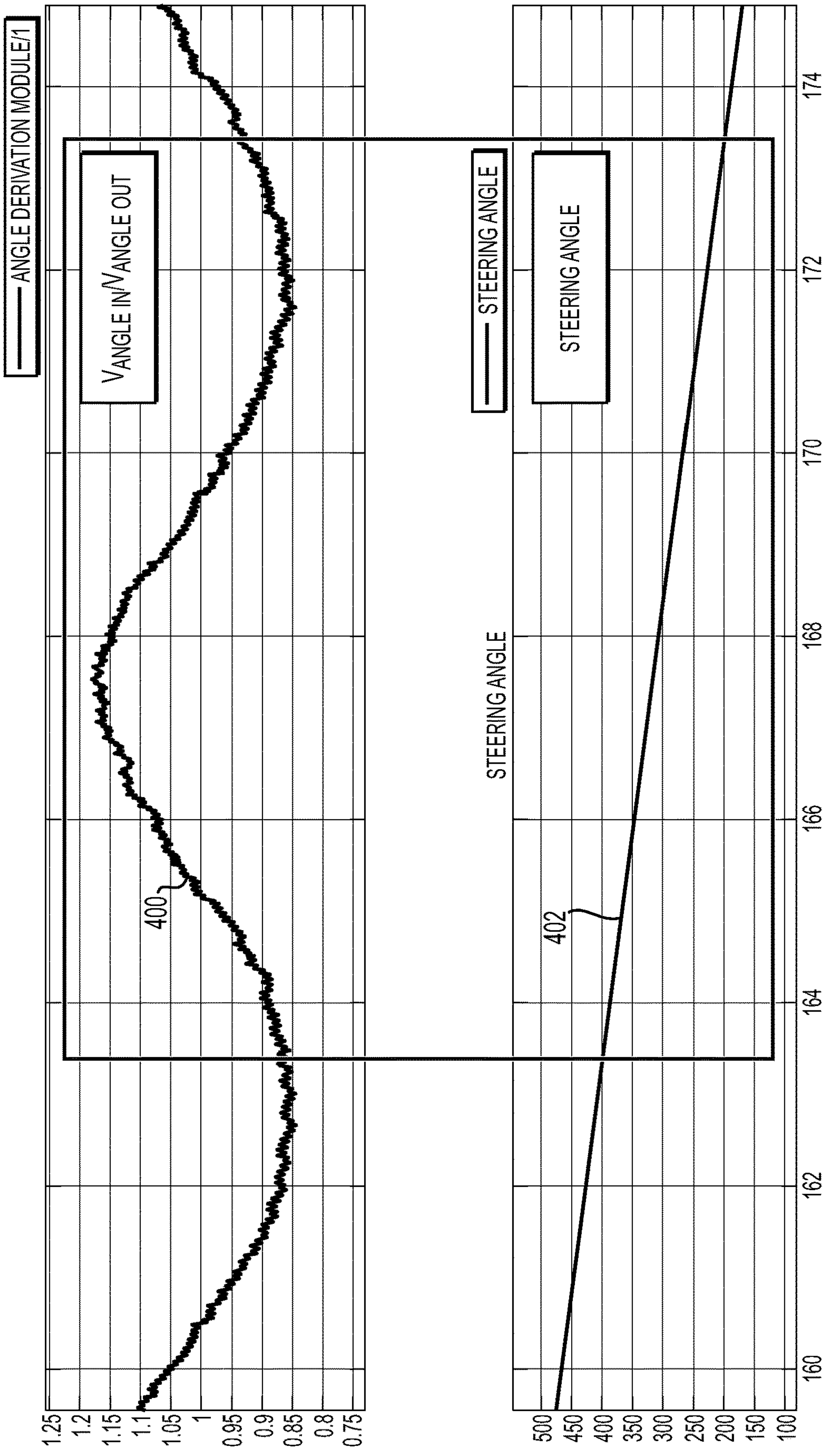
FIG. 12 shows graphs of data collection module data including a first plot of angular velocity ratio signal and a second plot of steering angle.

FIG. 12 shows graphs of data collection module data including a first plot 400 of angular velocity ratio signal and a second plot 402 of steering angle over a range of output angles from 400 to 200 degrees (shown at times 160 to 174 seconds). The output angles may represent a steering position provided by the steering gear 22.

Figure 13B:
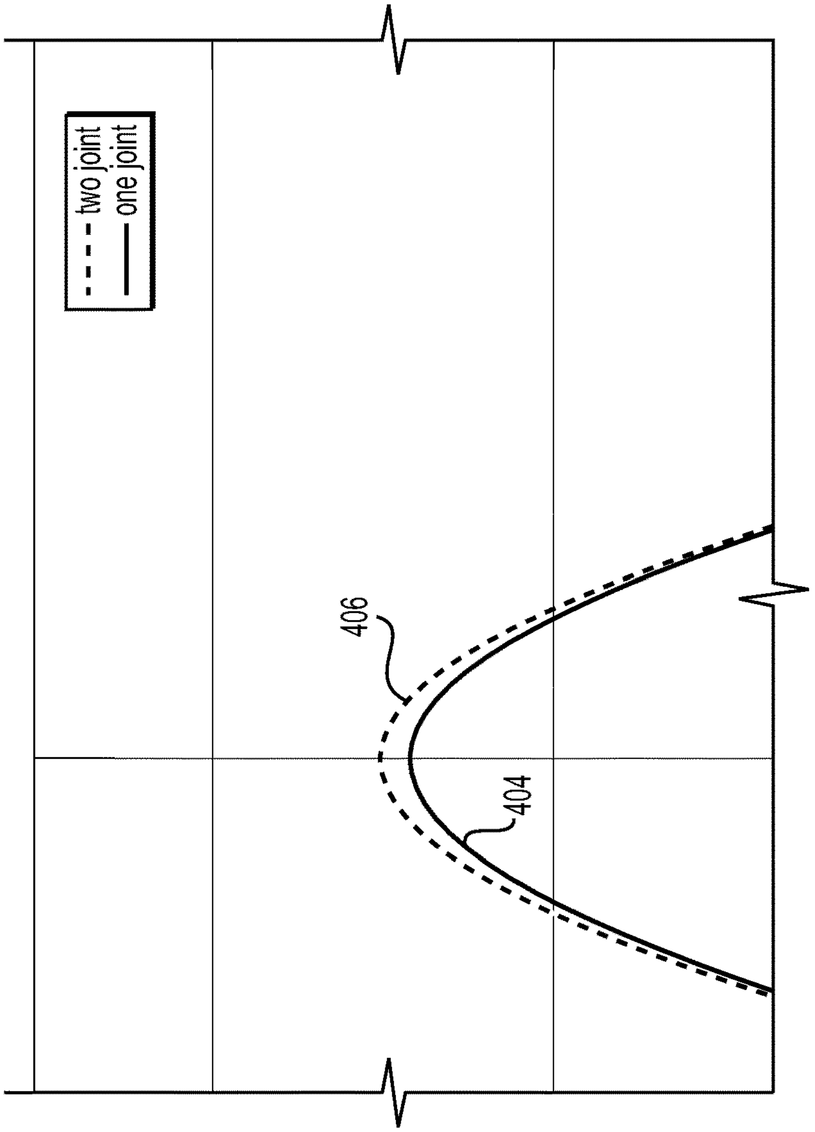
FIG. 13B is an enlarged portion of FIG. 13A.
Figure 13A:
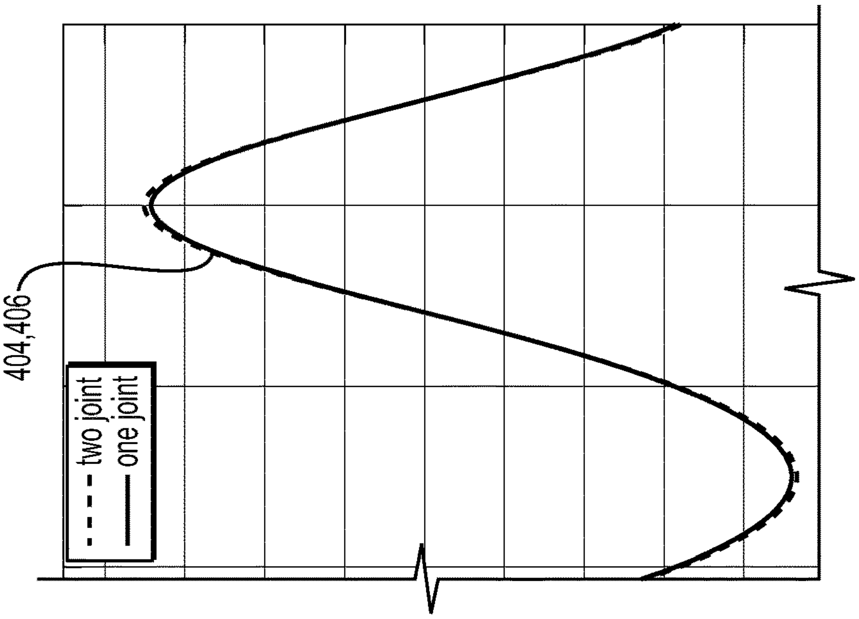
FIG. 13A shows a graph including plots representing torque fluctuation resulting from one universal joint and from two universal joints.

FIG. 13A shows a graph including plots 404, 406 representing torque fluctuation resulting from one universal joint and from two universal joints, and FIG. 13B is an enlarged portion of FIG. 13A.

The transfer function of torque fluctuation (Tout/Tin) caused by a pair of universal joints can be described by equation (2):

$$T_{out}/T_{in} = \frac{((1-\sin(\beta_2)\hat{}2.*\cos\left(a\tan\left(\tan(\varphi)/\cos(\beta_1)\right)+\psi\right).\hat{}2).*(1-\sin(\beta_1)\hat{}2*\cos(\varphi).\hat{}2)}{(\cos(\beta_2)*\cos(\beta_1)))} \tag{2}$$

As shown, equation (2) includes four different variables, φ, ψ, $\beta_1$, $\beta_2$. A control strategy using equation (2) may require monitoring and analyzing each of those four variables. The present disclosure provides a method to control torque fluctuation from one or more universal joints with fewer variables by simplifying the transfer function. A simplified transfer function is provided as equation (3):

$$T_{out}/T_{in} = (1-\sin\alpha\hat{}2*\cos\phi\hat{}2)/\cos\alpha \tag{3}$$

As shown in FIGS. 13A-13B, the formula for a single universal joint can produce a waveform similar to the formula for multiple universal joints. Therefore, the single universal joint formula is used instead of the multi universal joint formula for calculation. After simplifying the transfer function, only two variables need to be monitored and analyzed to control the torque fluctuation caused by a pair of universal joints 30, 34. Those two variables may also be called characteristic variables or feature variables.

After the signals are been preliminarily processed and the angular velocity ratio signal 132 is derived, the model building module 104 will further process the data and extract the feature values of the torque fluctuation, which can be used for torque compensation.

After the basic algorithm is simplified, the two characteristic variables to be determined are: the equivalent angle α and the equivalent phase φ. In order to extract the relevant characteristic variables, the system and method of the present disclosure establishes the relationship by extracting the maximum value Max_S of the characteristic fluctuation and the angle at the maximum value, Ang_Smax.

Figure 14:
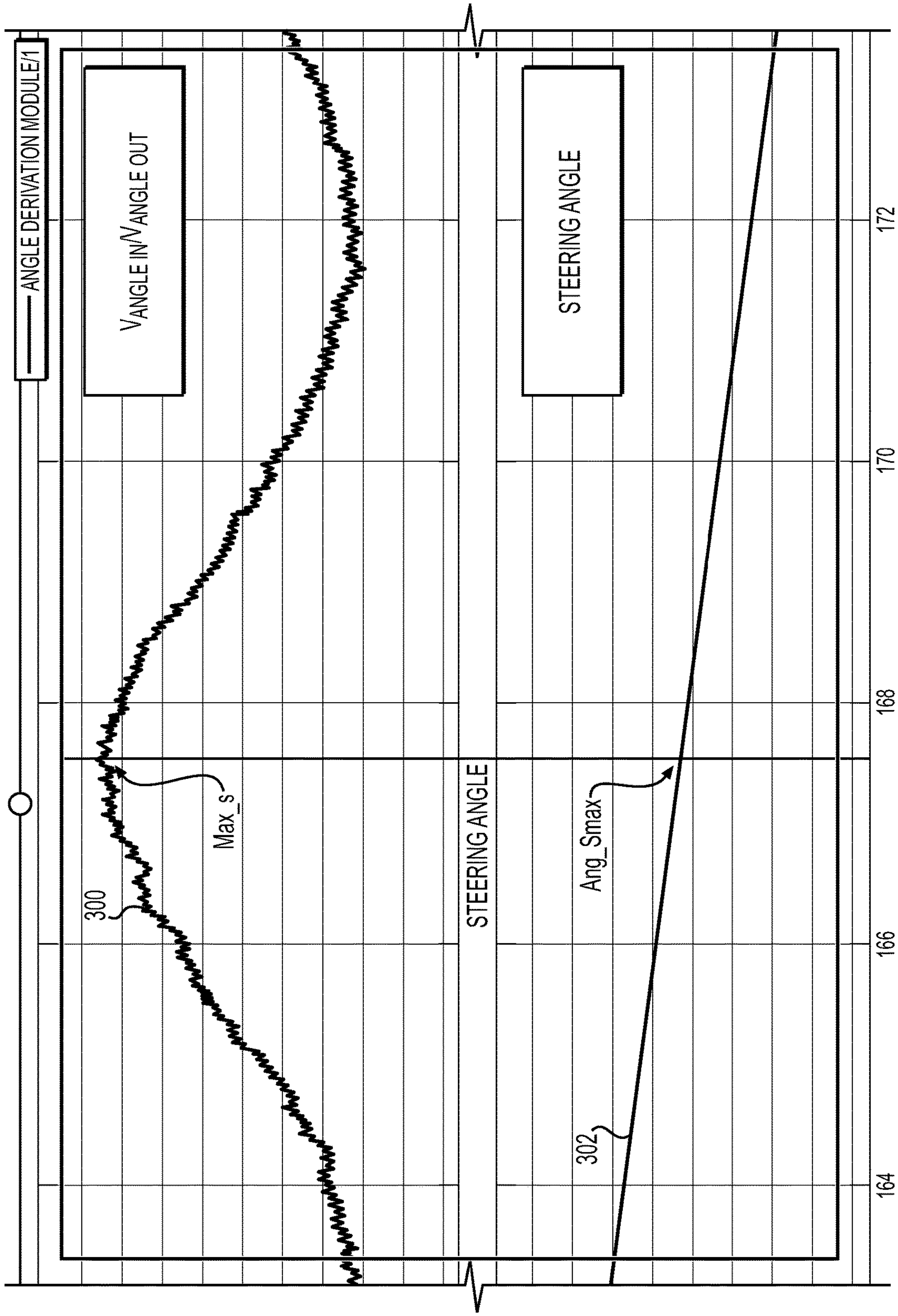
FIG. 14 shows the graph of FIG. 12 with a line indicating a maximum value of the angular velocity ratio signal, and a corresponding steering angle value.

FIG. 14 shows the graph of FIG. 12 with a line indicating a maximum value of the angular velocity ratio signal Max_S, and a corresponding steering angle value Ang_Smax.

We can establish a relationship between the equivalent angle α and the equivalent phase φ as set forth in equations (4) and (5), below:

$$\alpha = \frac{a*\text{Max\_S}\hat{}2 - b*\text{Max\_S} + c)}{(d*\text{Max\_S}\hat{}2 - e*\text{Max\_S} + f)} \tag{4}$$

-continued $$\varphi = -\text{mod}(\text{Ang\_Smax} * 0.2, 180)/180 * pi - pi/2 \quad (5)$$

Where "mod( )" is the modulo function to determine a remainder, and a, b, c, d, e, and f are each coefficients having a constant value.

The coefficients in equation (4) may meet the following criteria: a=1.51~1.57; b=2.78~2.84; c=1.24~1.31; d=0.985~1.34; e=1.28~1.025; f=0.29~0.38.

The present disclosure provides a method to determine the equivalent angle α and the equivalent phase φ of a mechanism having or more universal joints. For example, the ECU 40 can be programmed or otherwise configured to determine the equivalent angle α and the equivalent phase φ characteristic of the torque fluctuation caused by the pair of universal joints 30, 34 in the steering column 26, 28, 30, 32, 34.

The model building module 104 may be configured to determine the equivalent angle α and the equivalent phase φ based on the angular velocity ratio signal 132 and the filtered steering angle signal 130. For example, the model building module 104 may determine the maximum value of the angular velocity ratio signal Max_S, and the corresponding steering angle value Ang_Smax, and use those values to determine the equivalent angle α and the equivalent phase q using equations (4) and (5), provided herein. The model building module 104 may generate the equivalent angle signal 142 based on the equivalent angle α. The model building module 104 may also generate the equivalent phase signal 144 based on the equivalent phase φ. The model building module 104 may be configured to determine the equivalent angle α and the equivalent phase φ only while the angular velocity condition signal 134 is asserted. In other words, the model building module 104 may require the angular velocity condition signal 134 to be asserted before it will determine the equivalent angle α and the equivalent phase φ based on the angular velocity ratio signal 132 and the filtered steering angle signal 130.

The output and error-proofing module 106 may function to summarize the output of the established model and prevent errors. The output and error-proofing module 106 will determine whether the received model is valid according to the start signal 136 and the end signal 138 from the data collection module 102. The output and error-proofing module 106 may collect multiple sets of established model data. The output and error-proofing module 106 may also determine an average and/or a standard deviation value based on the multiple sets of established model data. The output and error-proofing module 106 may also and make judgments based on the average and/or the standard deviation value. The output and error-proofing module 106 may output the average value of the multiple sets of model data as the compensation phase signal 148 and the compensation angle signal 149 for use by the compensation torque calculator 108 after, and based on, determining the standard deviation satisfying a predetermined set of conditions.

Figure 15:
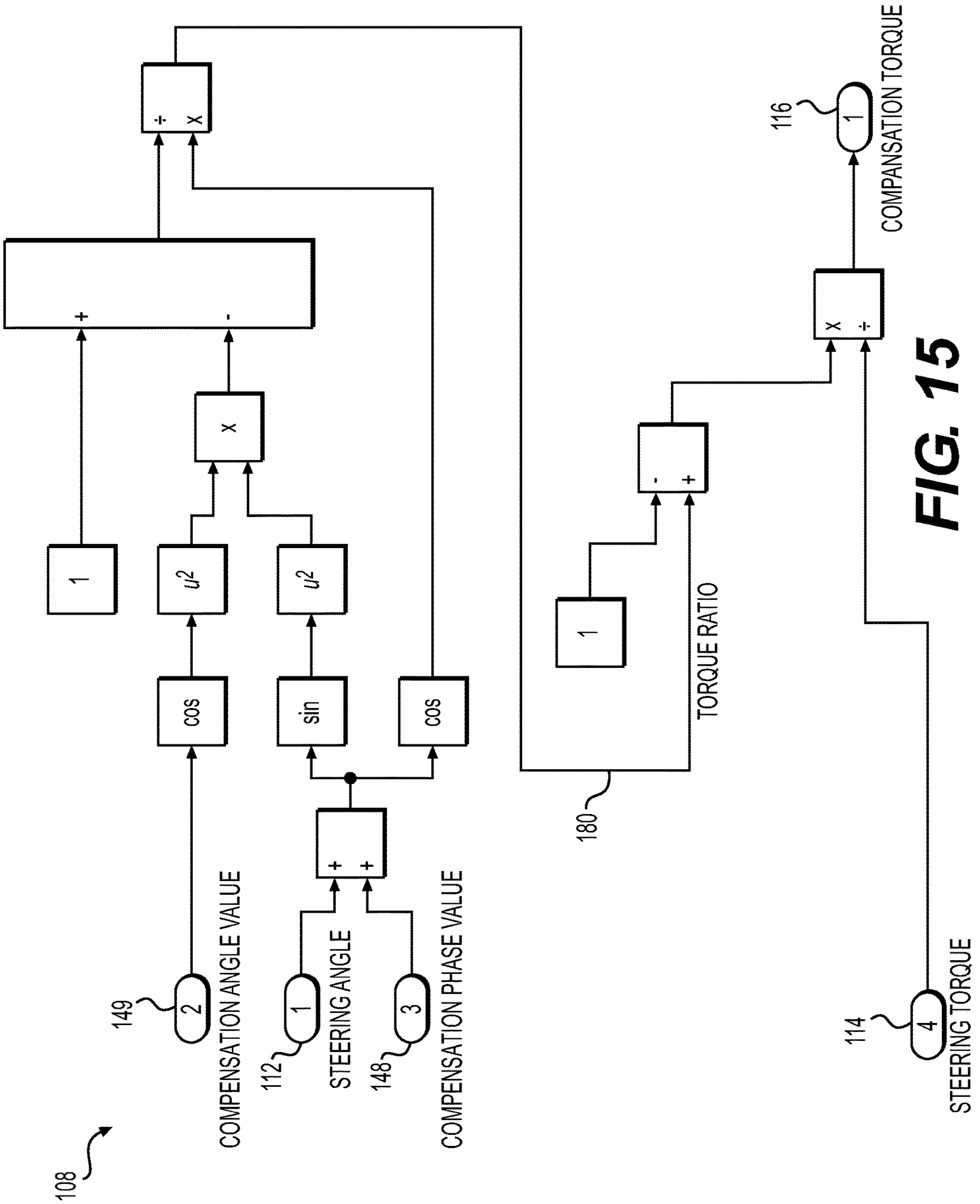
FIG. 15 shows a schematic block diagram of a compensation torque calculator of the system of FIG. 5.

FIG. 15 shows a schematic block diagram of the compensation torque calculator 108. As shown, the compensation torque calculator 108 takes, as inputs, the compensation phase signal 148, the compensation angle signal 149, the steering angle signal 112, and the steering torque signal 114. The compensation torque calculator 108 generates, as an output, the compensation torque signal 116 based each of: the compensation phase signal 148, the compensation angle signal 149, the steering angle signal 112, and the steering torque signal 114.

After obtaining the compensation angle signal 149 and the compensation phase signal 148 from the model building module 104, the compensation torque calculator 108 calculates a torque fluctuation percentage 180, which may also be called a torque ratio, according to the current angle value of the steering wheel (i.e. based on the steering angle signal 112). As shown on FIG. 15, the compensation torque calculator 108 also calculates the compensation torque signal 116 based on the torque fluctuation percentage 180 and the steering torque signal 114.

Figure 16:
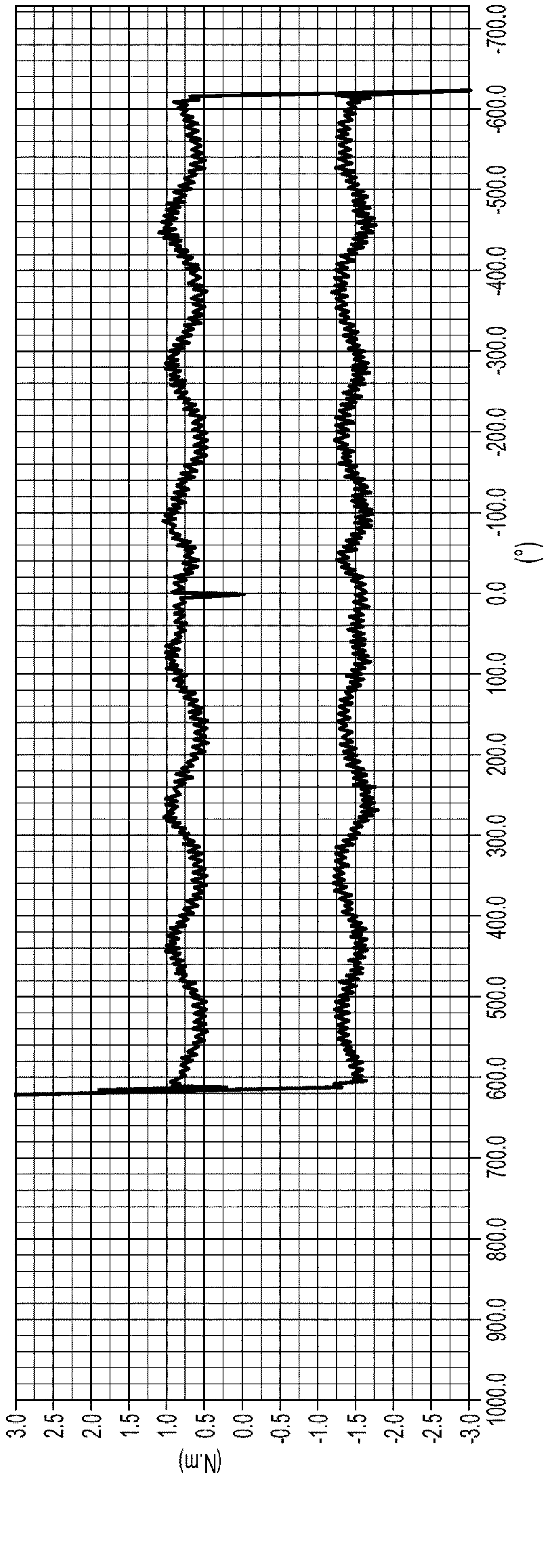
FIG. 16 shows a graph illustrating steering wheel torque fluctuation caused by a universal joint and without compensation.
Figure 17:
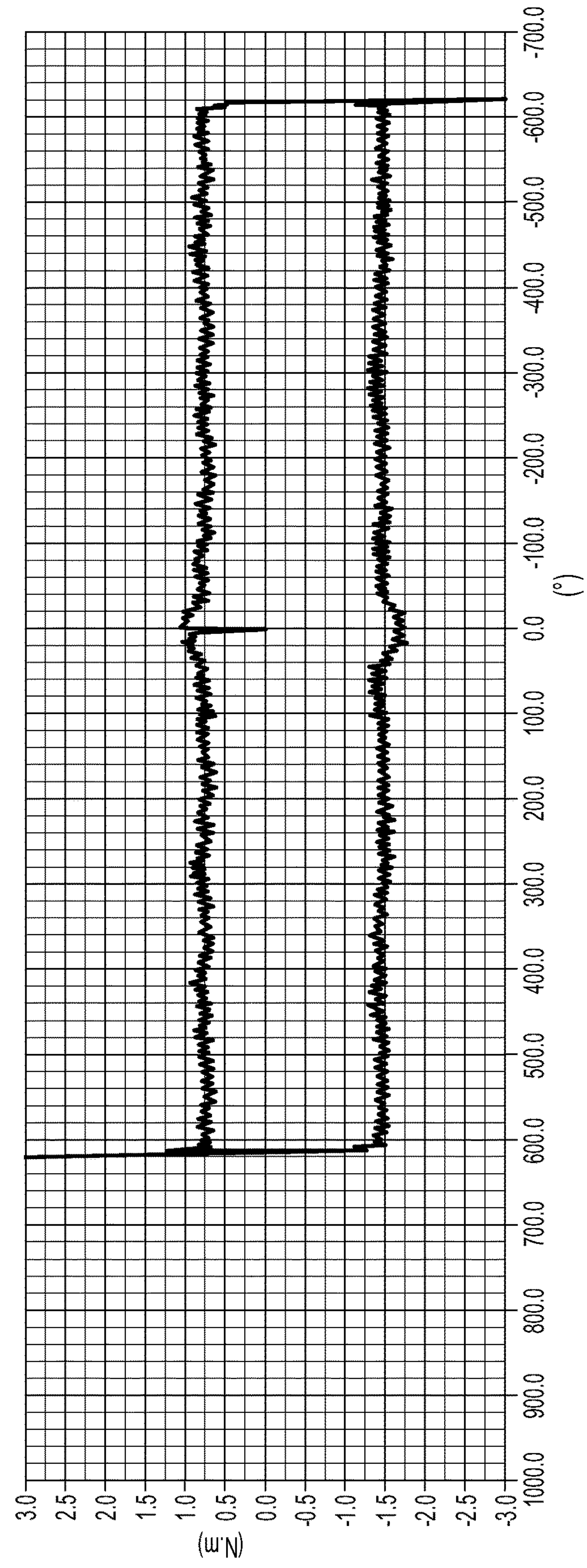
FIG. 17 shows a graph illustrating steering wheel torque fluctuation caused by a universal joint and with compensation using the system of the present disclosure.
Figure 18A:
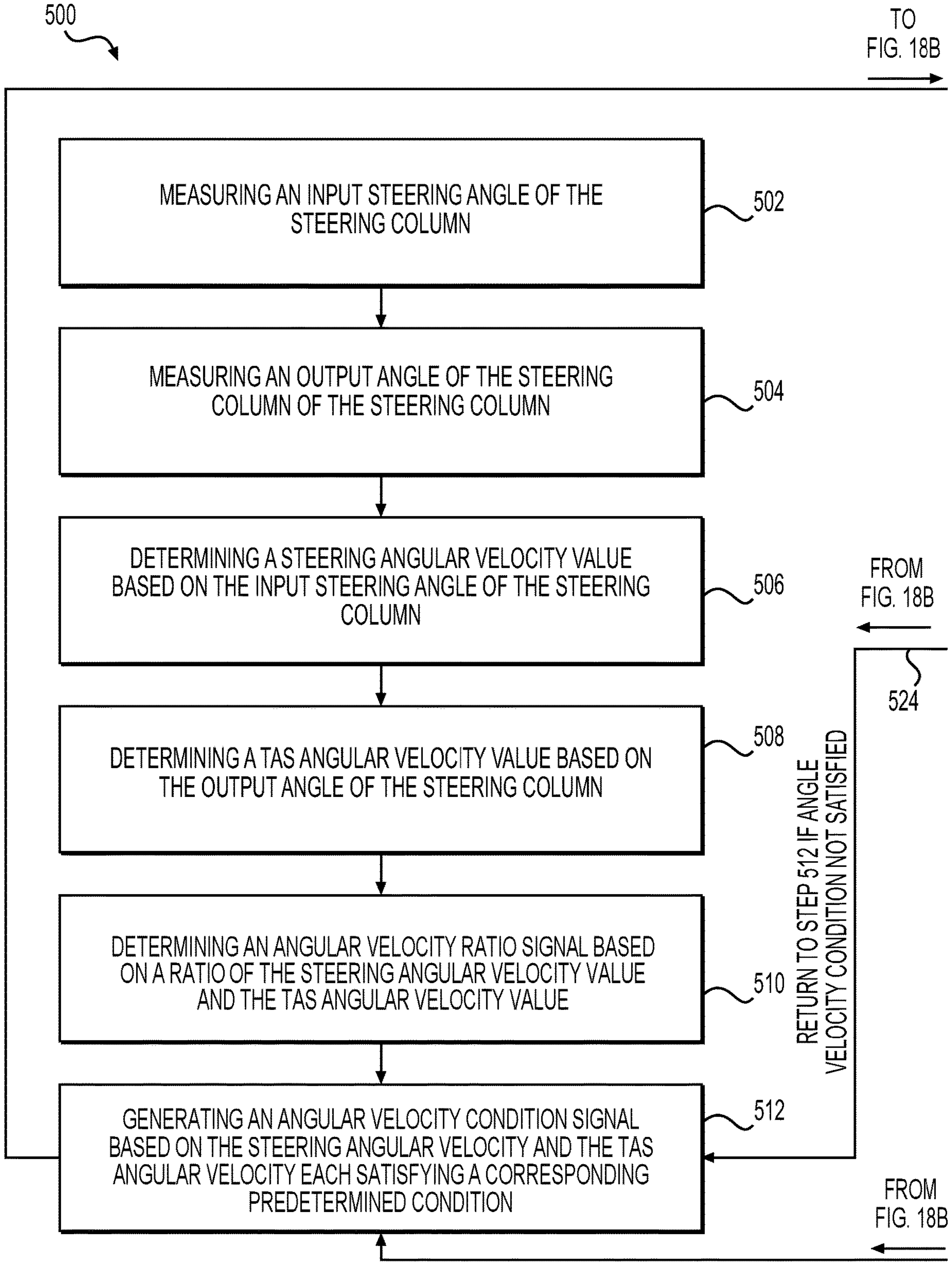
FIGS. 18A-18D show a flow chart listing steps in a method for modeling and compensating torque fluctuation in a steering column having at least one universal joint.
Figure 18B:
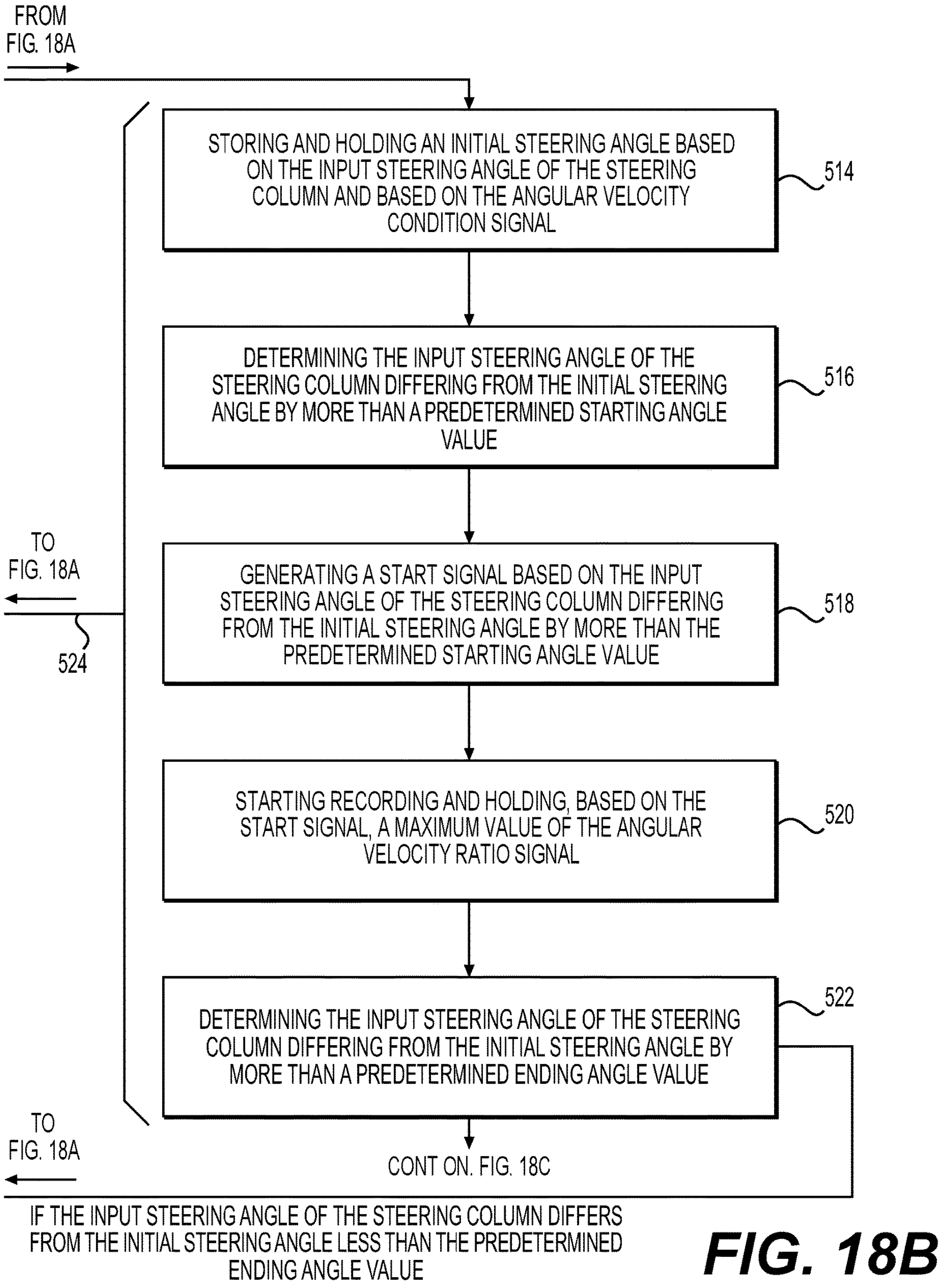
Figure 18C:
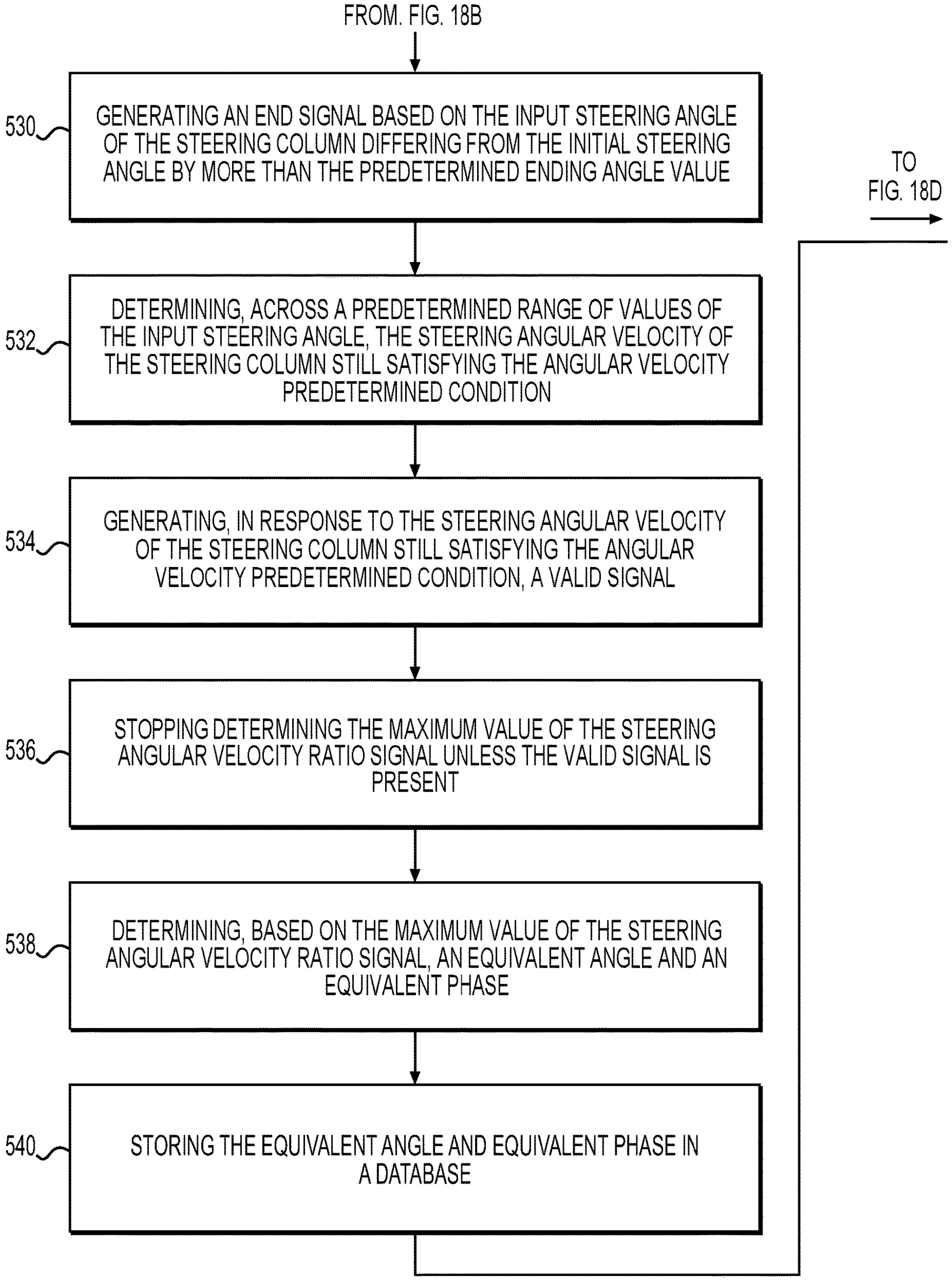
Figure 18D:
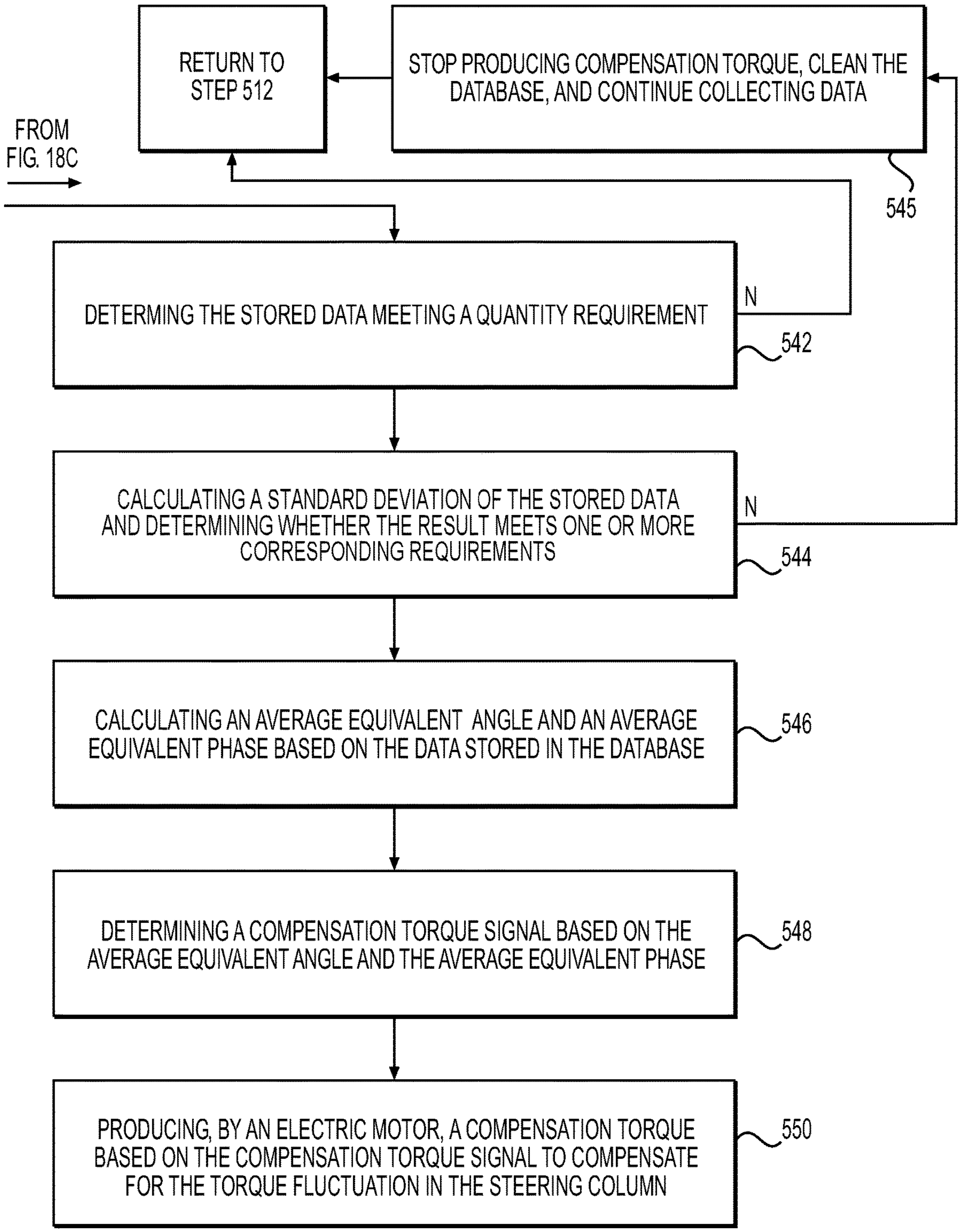

FIGS. 16-17 show different amounts of hand torque experienced by a driver holding the handwheel 24 with and without Universal joint compensation. FIG. 16 shows a graph illustrating steering wheel torque fluctuation caused by a universal joint and without compensation. As shown in FIG. 16, the torque fluctuates approximately 0.5 Nm, which is easily perceptible by most people. FIG. 17 shows a graph illustrating steering wheel torque fluctuation caused by a universal joint and with compensation using the system of the present disclosure. The torque fluctuation in FIG. 17 is approximately 0.125 Nm, which is a reduction by a factor of four. The torque fluctuation of approximately 0.125 Nm may be imperceptible to the driver.

According to an aspect of the disclosure, a system and method for computing a compensation torque signal to compensate for torque fluctuation from one or more universal joints can be implemented in any electronic control steering assistance system having a Torque Angle Sensor (TAS).

The present disclosure provides for using a steering gear with an electric motor to compensate for torque fluctuation caused by one or more universal joints in a steering column attached thereto.

The present disclosure provides a data collection module to calculate the torque output fluctuation ratio of the universal joint by collecting the input and output angles of the universal joint.

The present disclosure also provides a system and method for data collection to remove inaccurate parts of the data and monitor whether the data meets requirements.

The present disclosure also provides a new system and method to automatically model a current state of one or more universal joints in a steering column using the TAS and the steering wheel angle sensor.

The present disclosure also provides a simplified transfer function to replace a complex multi-gimbal transfer function. This simplified transfer function can increase efficiency of calculation by an ECU.

The present disclosure also provides a system and method that is adopted to simplify the calculation process of transfer function coefficients.

The system and method of the present disclosure can analyze, through signal calculation, a physical structure model of a steering column having one or more universal joints.

The present disclosure also provides output and error-proofing modules configured to check and determine whether the output is valid.

According to an aspect of the disclosure, the system and method can detect a change of the universal joint structure, such as a change that can result from a driver adjusting the steering wheel angle, and automatically adjust the compensation torque.

According to an aspect of the disclosure, the system and method can simplify a model of multiple universal joints. The present disclosure describes an embodiment having a steering column 26, 28, 30, 32, 34 with two universal joints 30, 34. However, the system and method of the present disclosure may be used to model and to compensate for torque fluctuation in linkages having one or more universal joint. For example, the system and method of the present disclosure may be used with mechanisms having three or more universal joints.

A method 500 of modeling and compensating torque fluctuation in a steering column having at least one universal joint is shown in the flow chart of FIGS. 18A-18D. One or more steps of the method 500 can be performed by the ECU 40, in accordance with some embodiments of the present disclosure. As can be appreciated in light of the disclosure, the order of operation within the method is not limited to the sequential execution as illustrated in FIGS. 18A-18D, but may be performed in one or more varying orders as applicable and in accordance with the present disclosure.

The method 500 includes measuring an input steering angle of the steering column at step 502. For example, the steering angle sensor 42 may measure the input steering angle and communicate a signal to the ECU 40 indicating the input steering angle, which may represent a steering angle of the handwheel 24.

The method 500 includes measuring an output angle of the steering column of the steering column at step 504. For example, the output angle sensor 45 of the TAS 44 may measure the angle of the output shaft 32 and communicate a signal to the ECU indicating the output angle of the steering column 26, 28, 30, 32, 34.

The method 500 also includes determining a steering angular velocity value based on the input steering angle of the steering column at step 506. For example, the processor 52 of the ECU 40 may execute instructions to implement the steering angular velocity calculator 160.

The method 500 also includes determining a TAS angular velocity value based on the output angle of the steering column at step 508. For example, the processor 52 of the ECU 40 may execute instructions to implement the TAS angular velocity calculator 162.

The method 500 also includes determining, at step 510, an angular velocity ratio signal based on a ratio of the steering angular velocity value and the TAS angular velocity value. For example, the processor 52 of the ECU 40 may execute instructions to implement the angular velocity ratio calculator 164.

The method 500 also includes generating, at step 512, an angular velocity condition signal based on the steering angular velocity and the TAS angular velocity each satisfying a corresponding predetermined condition. For example, the processor 52 of the ECU 40 may execute instructions to implement the angular velocity validator 166 and to generate the angular velocity condition signal 134 if both of the steering angular velocity satisfies the first predetermined condition and the TAS angular velocity satisfies the second predetermined condition.

The method 500 also includes storing and holding, at step 514, an initial steering angle based on the input steering angle of the steering column and based on the angular velocity condition signal. For example, the processor 52 of the ECU 40 may execute instructions to implement the S/H block 300 of the discriminant calculator 126.

The method 500 also includes determining, at step 516, the input steering angle of the steering column differing from the initial steering angle by more than a predetermined starting angle value at step 526. For example, the processor 52 of the ECU 40 may execute instructions to implement the fourth comparator 310 of the discriminant calculator 126. In some embodiments, the predetermined starting angle value may be 10-degrees.

The method 500 also includes generating, at step 518, a start signal based on the input steering angle of the steering column differing from the initial steering angle by more than the predetermined starting angle value. For example, the processor 52 of the ECU 40 may execute instructions to implement the start signal multiplier 312 of the discriminant calculator 126.

The method 500 also includes recording and holding, at step 520, and based on the start signal from step 518, a maximum value of the angular velocity ratio signal. For example, the processor 52 of the ECU 40 may execute instructions to implement the model building module 104 to determine the maximum value of the angular velocity ratio signal Max_S, and the corresponding steering angle value Ang_Smax as the input steering angle varies between a predetermined starting angle value, such as 10-degrees and a predetermined ending angle value, such as 200-degrees.

The method 500 also includes determining, at step 522, the input steering angle of the steering column differing from the initial steering angle by more than a predetermined ending angle value. Step 522 may further include returning back to step 512 if the input steering angle of the steering column differs from the initial steering angle less than the predetermined ending angle value. For example, the processor 52 of the ECU 40 may execute instructions to implement the fifth comparator 320 of the discriminant calculator 126. In some embodiments, the predetermined ending angle value may be 200-degrees.

The method 500 also includes returning, at step 524, back to step 512 if the angle velocity condition signal is not satisfied. For example, the processor 52 of the ECU 40 may only proceed with steps 514-522 while the angle velocity condition signal is and remains satisfied.

The method 500 also includes generating, at step 530, an end signal based on the input steering angle of the steering column differing from the initial steering angle by more than the predetermined ending angle value. For example, the processor 52 of the ECU 40 may execute instructions to implement the fifth comparator 320 of the discriminant calculator 126 to generate the end signal 138 based on determining, at step 522, the input steering angle of the steering column differing from the initial steering angle by more than the predetermined ending angle value.

The method 500 also includes determining, at step 532, and across a predetermined range of values of the input steering angle, the steering angular velocity value of the steering column still satisfying the angular velocity predetermined condition. For example, the processor 52 of the ECU 40 may execute instructions to implement the first angular velocity condition evaluator 270 of the angular velocity validator 166.

The method 500 also includes generating, at step 534, and based on the steering angular velocity value of the steering column still satisfying the angular velocity predetermined condition, a valid signal. For example, the processor 52 of the ECU 40 may execute instructions to implement the first angular velocity condition evaluator 270 of the angular velocity validator 166 and to produce the first angular velocity predetermined condition signal 271.

The method 500 also includes stopping determining, at step 536, the maximum value of the angular velocity ratio signal unless the valid signal from step 534 is present. Step 536 may include limiting or ending the performance of step 520 such that step 520 is only performed while the steering angular velocity of the steering column still satisfies the angular velocity predetermined condition, as determined at step 532. For example, the processor 52 of the ECU 40 may execute instructions to determine the maximum value of the angular velocity ratio signal Max_S, as illustrated graphically on FIG. 14.

The method 500 also includes determining, at step 538, and based on the maximum value of the angular velocity ratio signal, an equivalent angle and an equivalent phase. The equivalent angle and the equivalent phase may, together, characterize the torque fluctuation in the steering column generated by the at least one universal joint. For example, the processor 52 of the ECU 40 may execute instructions to implement the model building module 104.

In some embodiments, step 538 may include determining the equivalent angle α and the equivalent phase φ based on one or more of equations (4) and/or (5):

$$\alpha = \frac{a * \text{Max\_S}^\wedge 2 - b * \text{Max\_S} + c)}{(d * \text{Max\_S}^\wedge 2 - e * \text{Max\_S} + f)} \tag{4}$$

$$\varphi = -\text{mod}\,(\text{Ang\_Smax} * 0.2,\ 180\,)/180 * pi - pi/2 \tag{5}$$

Where "mod( )" is the modulo function to determine a remainder, and a, b, c, d, e, and f are each coefficients having a constant value. The coefficients in equation (4) may meet the following criteria: a=1.51~1.57; b=2.78~2.84; c=1.24~1.31; d=0.985~1.34; e=1.28~1.025; f=0.29~0.38.

In some embodiments, the method may be implemented to model torque fluctuation in a steering column having two universal joints. In some embodiments, the method may be implemented to model torque fluctuation in a steering column having three or more universal joints.

The method 500 also includes storing, at step 540, the equivalent angle and equivalent phase in a database. For example, the processor 52 of the ECU 40 may execute instructions to store values of the equivalent angle α and the equivalent phase φ in the data storage 58 of the storage memory 54.

The method 500 also includes determining, at step 542, the stored data meeting a quantity requirement. For example, the processor 52 of the ECU 40 may execute instructions to check that the quantity of stored values of the equivalent angle α and the equivalent phase φ in the data storage 58 satisfies the quantity requirement. Otherwise, inaccuracies may result insufficient data. The method 500 may return to step 512 if step 542 determines the stored data not to meet the quantity requirement.

The method 500 also includes calculating, at step 544, a standard deviation of the stored data and determining whether the result meets one or more corresponding requirements. For example, the processor 52 of the ECU 40 may execute instructions to compute the standard deviation of the stored values of the equivalent angle α and the equivalent phase φ in the data storage 58 and to determine whether those standard deviation values meet the corresponding requirements. The method 500 may proceed, at step 545, and in response to determining the standard deviation values not meeting the corresponding requirements, stop producing any compensation torque, clean the database, continue collecting data, and return to step 512.

The method 500 also includes calculating, at step 546, an average equivalent angle and an average equivalent phase based on the data stored in the database. For example, the processor 52 of the ECU 40 may execute instructions to compute the standard average equivalent angle and the average equivalent phase based on the stored values of the equivalent angle α and the equivalent phase φ in the data storage 58.

The method 500 also includes determining, at step 548, a compensation torque signal based on the average equivalent angle and the average equivalent phase. For example, the processor 52 of the ECU 40 may execute instructions to implement the compensation torque calculator 108.

The method 500 also includes producing, at step 550, by an electric motor, a compensation torque based on the compensation torque signal to compensate for the torque fluctuation in the steering column. For example, the ECU 40 may generate or modify a command sent to the inverter 60 to cause the electric motor 62 to produce the compensation torque.

The system, methods and/or processes described above, and steps thereof, may be realized in hardware, software or any combination of hardware and software suitable for a particular application. The hardware may include a general purposed computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or alternatively, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices as well as heterogeneous combinations of processors processor architectures, or combinations of different hardware and software, or any other machine capable of executing program instructions.

Thus, in one aspect, each method described above and combinations thereof may be embodied in computer executable code that, when executing on one or more computing devices performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The foregoing description is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for compensating torque fluctuation in a steering column having at least one universal joint, the method comprising:

measuring an input steering angle of the steering column;

measuring an output angle of the steering column;

determining a steering angular velocity value based on the input steering angle of the steering column;

determining a TAS angular velocity value based on the output angle of the steering column;

determining an angular velocity ratio signal based on a ratio of the steering angular velocity value and the TAS angular velocity value;

determining, across a predetermined ranges of values of the input steering angle, a maximum value of the angular velocity ratio signal;

determining, based on the maximum value of the angular velocity ratio signal, an equivalent angle and an equivalent phase, wherein the equivalent angle and the equivalent phase together characterize the torque fluctuation in the steering column that is generated by the at least one universal joint;

determining a compensation torque signal based on the equivalent angle and the equivalent phase; and producing, by an electric motor, a compensation torque based on the compensation torque signal to compensate for the torque fluctuation in the steering column.

2. The method of claim 1, wherein determining the equivalent angle includes calculating the equivalent angle α in accordance with:

$$\alpha = \frac{a * \text{Max\_S}^\wedge 2 - b * \text{Max\_S} + c)}{(d * \text{Max\_S}^\wedge 2 - e * \text{Max\_S} + f)},$$

where Max_S represents the maximum value of the angular velocity ratio signal and a, b, c, d, e, and f are each coefficients having a constant value.

3. The method of claim 2, wherein coefficient a has a value between 1.51 and 1.57; coefficient b has a value between 2.78 and 2.84; coefficient c has a value between 1.24 and 1.31; coefficient d has a value between 0.985 and 1.34; coefficient e has a value between 1.28 and 1.025; and coefficient f has a value between 0.29 and 0.38.

4. The method of claim 1, wherein determining the equivalent phase includes calculating the equivalent phase φ in accordance with: φ=−mod(Ang_Smax*0.2,180)/180*pi−pi/2, where Ang_Smax represents a value of the input steering angle that corresponds to the maximum value of the angular velocity ratio signal, and mod( ) is a modulo function to determine a remainder.

5. The method of claim 1, wherein the at least one universal joint includes two universal joints.

6. The method of claim 1, wherein the at least one universal joint includes three or more universal joints.

7. The method of claim 1, further comprising:

storing a plurality of values of each of the equivalent angle and equivalent phase; and calculating an average equivalent angle and an average equivalent phase based on the plurality of values of each of the equivalent angle and equivalent phase, wherein determining the compensation torque signal based on the equivalent angle and the equivalent phase further includes determining the compensation torque signal based on the average equivalent angle and the average equivalent phase.

8. The method of claim 1, further comprising:

determining the steering angular velocity satisfying a first predetermined condition;

determining the TAS angular velocity satisfying a second predetermined condition; and generating an angular velocity condition signal based on the steering angular velocity satisfying the first predetermined condition, and based on the TAS angular velocity satisfying the second predetermined condition.

9. The method of claim 8, wherein at least one of determining the steering angular velocity satisfying the first predetermined condition and determining the TAS angular velocity satisfying the second predetermined condition includes determining a corresponding one of the steering angular velocity and the TAS angular velocity being greater than a lower angular velocity threshold value.

10. The method of claim 8, wherein at least one of: determining the steering angular velocity satisfying the first predetermined condition, and determining the TAS angular velocity satisfying the second predetermined condition includes determining a corresponding one of the steering angular velocity and the TAS angular velocity being less than an upper angular velocity threshold value.

11. The method of claim 8, further comprising:

storing and holding an initial steering angle based on the input steering angle of the steering column and based on the angular velocity condition signal;

determining the input steering angle of the steering column differing from the initial steering angle by more than a predetermined starting angle value;

generating a start signal based on the input steering angle of the steering column differing from the initial steering angle by more than the predetermined starting angle value; and starting recording and holding the maximum value of the angular velocity ratio signal based on the start signal.

12. The method of claim 8, further comprising: determining, across a predetermined range of values of the input steering angle, the steering angular velocity of the steering column still satisfying the first predetermined condition, wherein determining the maximum value of the angular velocity ratio signal includes determining the maximum value of the angular velocity ratio signal only while the steering angular velocity of the steering column still satisfies the first predetermined condition.

13. A system for compensating torque fluctuation in a steering column having at least one universal joint, the system comprising:

an electric motor operably coupled to the steering column;

an inverter configured to supply power to the electric motor;

a steering angle sensor configured to measure an input steering angle of the steering column;

an output angle sensor configured to measure output angle of the steering column; and an electronic control unit in functional communication with the inverter and configured to:

determine a steering angular velocity value based on the input steering angle of the steering column;

determine a TAS angular velocity value based on the output angle of the steering column;

determine an angular velocity ratio signal based on a ratio of the steering angular velocity value and the TAS angular velocity value;

determine, across a predetermined ranges of values of the input steering angle, a maximum value of the angular velocity ratio signal;

determine, based on the maximum value of the angular velocity ratio signal, an equivalent angle and an equivalent phase, wherein the equivalent angle and the equivalent phase together characterize the torque fluctuation in the steering column generated by the at least one universal joint;

determine a compensation torque signal based on the equivalent angle and the equivalent phase; and command the inverter based on the compensation torque signal to cause the electric motor to produce a compensation torque to compensate for the torque fluctuation in the steering column.

14. The system of claim 13, wherein determining the equivalent angle includes the electronic control unit being further configured to calculate the equivalent angle α in accordance with:

$$\alpha = \frac{a * \text{Max\_S}^\wedge 2 - b * \text{Max\_S} + c)}{(d * \text{Max\_S}^\wedge 2 - e * \text{Max\_S} + f)},$$

where Max_S represents the maximum value of the angular velocity ratio signal and a, b, c, d, e, and f are each coefficients having a constant value.

15. The system of claim 14, wherein coefficient a has a value between 1.51 and 1.57; coefficient b has a value between 2.78 and 2.84; coefficient c has a value between 1.24 and 1.31; coefficient d has a value between 0.985 and 1.34; coefficient e has a value between 1.28 and 1.025; and coefficient f has a value between 0.29 and 0.38.

16. The system of claim 13, wherein determining the equivalent phase includes the electronic control unit being further configured to calculate the equivalent phase φ in accordance with: φ=−mod(Ang_Smax*0.2,180)/180*pi−pi/2, where Ang_Smax represents a value of the input steering angle that corresponds to the maximum value of the angular velocity ratio signal, and mod( ) is a modulo function to determine a remainder.

17. The system of claim 13, wherein the at least one universal joint includes two or more universal joints.

18. The system of claim 13, wherein the electronic control unit is further configured to:

determine the steering angular velocity satisfying a first predetermined condition;

determine the TAS angular velocity satisfying a second predetermined condition; and generate an angular velocity condition signal based on the steering angular velocity satisfying the first predetermined condition, and based on the TAS angular velocity satisfying the second predetermined condition.

19. The system of claim 18, wherein the electronic control unit is further configured to:

store and holding an initial steering angle based on the input steering angle of the steering column and based on the angular velocity condition signal;

determine the input steering angle of the steering column differing from the initial steering angle by more than a predetermined starting angle value;

generate a start signal based on the input steering angle of the steering column differing from the initial steering angle by more than the predetermined starting angle value; and start recording and holding the maximum value of the angular velocity ratio signal based on the start signal.

20. The system of claim 18, wherein the electronic control unit is further configured to:

determine, across a predetermined range of values of the input steering angle, the steering angular velocity of the steering column still satisfying the first predetermined condition, wherein determining the maximum value of the angular velocity ratio signal includes determining the maximum value of the angular velocity ratio signal only while the steering angular velocity of the steering column still satisfies the first predetermined condition.

* * * * *